(12) United States Patent
Wang et al.

(10) Patent No.: US 11,979,605 B2
(45) Date of Patent: May 7, 2024

(54) ATTRIBUTE LAYERS AND SIGNALING IN POINT CLOUD CODING

(71) Applicant: Huawei Technologies Co., Ltd., Shenzhen (CN)

(72) Inventors: Ye-Kui Wang, San Diego, CA (US); Fnu Hendry, San Diego, CA (US); Vladyslav Zakharchenko, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 17/200,418

(22) Filed: Mar. 12, 2021

(65) Prior Publication Data

US 2021/0203989 A1 Jul. 1, 2021

Related U.S. Application Data

(63) Continuation of application No. PCT/US2019/050413, filed on Sep. 10, 2019.

(Continued)

(51) Int. Cl.
*H04N 19/597* (2014.01)
*G06T 9/00* (2006.01)
(Continued)

(52) U.S. Cl.
CPC ............. *H04N 19/597* (2014.11); *G06T 9/00* (2013.01); *H04N 19/172* (2014.11);
(Continued)

(58) Field of Classification Search
CPC .. H04N 19/597; H04N 19/172; H04N 19/184; H04N 19/46; H04N 19/70; G06T 9/00
See application file for complete search history.

(56) References Cited

U.S. PATENT DOCUMENTS

| 10,262,451 | B1 * | 4/2019 | Chou .................... G06T 15/205 |
| 2005/0007263 | A1 | 1/2005 | Zhou |

(Continued)

FOREIGN PATENT DOCUMENTS

| CN | 105027567 A | 11/2015 |
| KR | 20140126762 A | 10/2014 |

(Continued)

OTHER PUBLICATIONS

U.S. Appl. No. 62/697,369 filed Jul. 2018, Mammou: Khaled.*

(Continued)

*Primary Examiner* — Jonathan R Messmore
(74) *Attorney, Agent, or Firm* — Conley Rose, P.C.

(57) ABSTRACT

A video coding mechanism is disclosed. The mechanism includes receiving a bitstream comprising a plurality of coded sequences of point cloud coding (PCC) frames. The plurality of coded sequences of PCC frames represent a plurality of PCC attributes including geometry, texture, and one or more of reflectance, transparency, and normal. Each coded PCC frame is represented by one or more PCC network abstraction layer (NAL) units.
The mechanism also includes parsing the bitstream to obtain, for each PCC attribute, an indication of one of a plurality of video codecs used to code the corresponding PCC attribute. The mechanism also includes decoding the bitstream based on the indicated video codecs for the PCC attributes.

16 Claims, 13 Drawing Sheets

Related U.S. Application Data

(60) Provisional application No. 62/731,693, filed on Sep. 14, 2018.

(51) Int. Cl.
*H04N 19/172* (2014.01)
*H04N 19/184* (2014.01)
*H04N 19/46* (2014.01)
*H04N 19/70* (2014.01)

(52) U.S. Cl.
CPC ........... *H04N 19/184* (2014.11); *H04N 19/46* (2014.11); *H04N 19/70* (2014.11)

(56) References Cited

U.S. PATENT DOCUMENTS

| | | | |
|---|---|---|---|
| 2014/0003535 A1 | 1/2014 | Haque et al. | |
| 2014/0064384 A1 | 3/2014 | Wang | |
| 2014/0219346 A1 | 8/2014 | Ugur et al. | |
| 2014/0300758 A1* | 10/2014 | Tran | H04N 23/635 |
| | | | 348/207.1 |
| 2016/0105687 A1* | 4/2016 | Deshpande | H04N 19/90 |
| | | | 375/240.25 |
| 2017/0347100 A1 | 11/2017 | Chou et al. | |
| 2018/0063543 A1 | 3/2018 | Reddy et al. | |
| 2019/0087979 A1* | 3/2019 | Mammou | H04N 19/597 |
| 2019/0313110 A1* | 10/2019 | Mammou | H04N 19/88 |
| 2021/0235056 A1 | 7/2021 | Takahashi et al. | |
| 2021/0281880 A1 | 9/2021 | Litwic | |

FOREIGN PATENT DOCUMENTS

| | | | |
|---|---|---|---|
| KR | 20150103728 A | 9/2015 | |
| WO | 2007081150 A1 | 7/2007 | |
| WO | 2017205794 A1 | 11/2017 | |
| WO | 2020008758 A1 | 1/2020 | |

OTHER PUBLICATIONS

3DG Subgroup et al.,"First Working Draft for PCC Category 2",International Organization for Standardization Organisation Internationale De Normalisation ISO/IEC JTC 1/SC 29/WG 11 , Coding of Moving Pictures and Audio, ISO/IEC JTC1/SC29/WG11, MPEG 2012/NA3878, Jan. 2018, Gwangju, Korea,XP030024020,total:5pages.

3DG subgroup et al.,"Working draft of Point Cloud Coding for Category 2 (Draft 1)", International Organization for Standardization Organisation Internationale De Normalisation, ISOAEC JTC1/SC29/WG11, Coding of Moving Pictures and Audio, ISO/IEC JTC1/SC29/WG11 N17534, Apr. 2018, San Diego, US,XP030191453,total:38pages.

Schwarz response (Nokia) S et al: Nokia s response to CfP for Point Cloud Compression(Category 2) 120. MPEG Meeting: Oct. 23, 2017-Oct. 27, 2017, Macau, (Motion Picture Expertgroup or ISO/IEC JTC1/SC29/WG11) XP030260370,Total:22Pages.

Y K Wang (FUTUREWEI):On U PCC high level syntax 127 .MPEG MEETING;Jul. 8, 2019 Jul. 12, 2019; Gothenburg;(Motion Picture Expert Group or ISO/IEC JTC1/SC29/WG11) XP030222283, Total: 142Pages.

"Line Transmission of Non-Telephone Signals Video Codec for Audiovisual Services AT p×64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video," ITU-T Recommendation H.263, Jan. 2005, 226 pages.

"Series H: Audiovisual and Multimedia Systems Infrastructure of audiovisual services—Coding of moving video; Advanced video coding for generic audiovisual services," Recommendation ITU-T H.264, Jun. 2019, 836 pages.

"Series H: Audiovisual and Multimedia Systems Infrastructure of audiovisual services Coding of moving video; High efficiency video coding," Recommendation ITU-T H.265, Apr. 2013, 317 pages.

Document: JVET-K1001-v4, Bross, B., et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 86 pages.

Document: JVET-K1002-v1, Chen, J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 19 pages.

Document: JVET-L0467, Tourapis, A., et al., "Multi-component video coding: an extension for truly versatile video/image compression," Joint Video Exploration Team (JVET) of ITU-T SG 16 WP 3 and ISO/IEC JTC 1/SC 29/WG 11 12th Meeting: Macao, CN, Oct. 3-12, 2018, 6 pages.

Cha, J-H., "Introduction to the recent trends regarding the MPEG standardization," OSIA S&TR Journal ISSN 1738-9887 vol. 30, No. 3, Sep. 2017, 30 pages (with en English abstract).

Y-K Wang,. "On PCC high-level syntax," ISO/IEC JTC1/SC29/WG11 MPEG2018/M42961, No. m42961, Jul. 2018, Ljubljana, SI, XP030195567, 4 pages.

Flynn David: "PCC TMC13: a self-contained high level syntax," ISO/IEC JTC1/SC29/WG11 MPEG/m43953, Jul. 2018, Ljubljana, Slovenia, XP055831855, 7 pages.

\* cited by examiner

ATTRIBUTE LAYERS AND SIGNALING IN POINT CLOUD CODING

CROSS-REFERENCE TO RELATED APPLICATIONS

This patent application is a continuation of International Application No. PCT/US2019/050413, filed Sep. 10, 2019 by Ye-Kui Wang, et. al., and titled "Improved Attribute Layers And Signaling In Point Cloud Coding," which claims the benefit of U.S. Provisional Patent Application No. 62/731,693, filed Sep. 14, 2018 by Ye-Kui Wang, et. al., and titled "High-Level Syntax Designs for Point Cloud Coding," each of which is hereby incorporated by reference.

TECHNICAL FIELD

The present disclosure is generally related to video coding, and is specifically related to coding of video attributes for point cloud coding (PCC) video frames.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a video decoder. The method comprises receiving, by a receiver, a bitstream comprising a plurality of coded sequences of point cloud coding (PCC) frames, wherein the plurality of coded sequences of PCC frames represent a plurality of PCC attributes including geometry, texture, and one or more of reflectance, transparency, and normal, and wherein each coded PCC frame is represented by one or more PCC network abstraction layer (NAL) units. The method further comprises parsing, by a processor, the bitstream to obtain, for each PCC attribute, an indication of one of a plurality of video coder decoders (codecs) used to code the corresponding PCC attribute. The method further comprises decoding, by the processor, the bitstream based on the indicated video codecs for the PCC attributes. In some video coding systems, an entire sequence of PCC frames is coded by using a single codec. PCC frames may include a plurality of PCC attributes. Some video codecs may be more efficient for encoding some PCC attributes than others. The present embodiment allows different video codecs to encode different PCC attributes for the same sequence of PCC frames. The present embodiment also provides various syntax elements to support coding flexibility when the PCC frames in the sequence employ multiple PCC attributes (e.g., three or more). By providing for more attributes, the encoder can encode more complex PCC frames. Further, the decoder can decode, and hence display, more complex PCC frames. Further, by allowing different codecs to be employed for different attributes, the coding process can be optimized based on codec selection. This may reduce processor resource usage at both the encoder and decoder. Further, this may support increased compression and coding efficiency, which reduces memory usage as well as network resource usage while transmitting the bitstream between the encoder and decoder.

Optionally, in any of the preceding aspects, another implementation of the aspect provides, wherein each sequence of PCC frames is associated with a sequence-level data unit containing sequence-level parameters, wherein the sequence-level data unit comprises a first syntax element indicating a first attribute is coded by a first video codec and indicating a second attribute is coded by a second video codec.

Optionally, in any of the preceding aspects, another implementation of the aspect provides, wherein the first syntax element is an identified_codec_for_attribute element contained in a group of frames header in the bitstream.

Optionally, in any of the preceding aspects, another implementation of the aspect provides, wherein the first attribute is organized into a plurality of streams, and wherein a second syntax element indicates a stream membership for data units of the bitstream associated with the first attribute.

Optionally, in any of the preceding aspects, another implementation of the aspect provides, wherein the first attribute is organized into a plurality of layers, and wherein a third syntax element indicates a layer membership for data units of the bitstream associated with the first attribute.

Optionally, in any of the preceding aspects, another implementation of the aspect provides, wherein the second syntax element is a num_streams_for_attribute element contained in a group of frames header in the bitstream, and wherein the third syntax element is a num_layers_for_attribute element contained in the group of frames header in the bitstream.

Optionally, in any of the preceding aspects, another implementation of the aspect provides, wherein a fourth syntax element indicates a first layer of the plurality of layers contains data associated with an irregular point cloud.

Optionally, in any of the preceding aspects, another implementation of the aspect provides, wherein the fourth syntax element is a regular_points_flag element contained in a group of frames header in the bitstream.

Optionally, in any of the preceding aspects, another implementation of the aspect provides, wherein the bitstream is decoded into a decoded sequence of PCC frames, and further comprising forwarding, by the processor, the decoded sequence of PCC frames toward a display for presentation.

In an embodiment, the disclosure includes a method implemented in a video encoder. The method comprises encoding, by a processor, a plurality of PCC attributes of a sequence of PCC frames into a bitstream with a plurality of codecs, wherein the plurality of PCC attributes include geometry, texture, and one or more of reflectance, transparency, and normal, and wherein each coded PCC frame is represented by one or more PCC NAL units. The method further comprises encoding, by the processor, for each PCC attribute, an indication of one of the video codecs used to code the corresponding PCC attribute. The method further comprises transmitting, by a transmitter, the bitstream toward a decoder. In some video coding systems, an entire sequence of PCC frames is coded by using a single codec. PCC frames may include a plurality of PCC attributes. Some video codecs may be more efficient for encoding some PCC attributes than others. The present embodiment allows different video codecs to encode different PCC attributes for the same sequence of PCC frames. The present embodiment also provides various syntax elements to support coding flexibility when the PCC frames in the sequence employ multiple PCC attributes (e.g., three or more). By providing for more attributes, the encoder can encode more complex PCC frames. Further, the decoder can decode, and hence display, more complex PCC frames. Further, by allowing different codecs to be employed for different attributes, the coding process can be optimized based on codec selection. This may reduce processor resource usage at both the encoder and decoder. Further, this may support increased compression and coding efficiency, which reduces memory usage as well as network resource usage while transmitting the bitstream between the encoder and decoder.

Optionally, in any of the preceding aspects, another implementation of the aspect provides, wherein the sequence of PCC frames is associated with a sequence-level data unit containing sequence-level parameters, wherein the sequence-level data unit comprises a first syntax element indicating a first PCC attribute is coded by a first video codec and indicating a second PCC attribute is coded by a second video codec.

Optionally, in any of the preceding aspects, another implementation of the aspect provides, wherein the first syntax element is an identified_codec_for_attribute element contained in a group of frames header in the bitstream.

Optionally, in any of the preceding aspects, another implementation of the aspect provides, wherein the first attribute is organized into a plurality of streams, and wherein a second syntax element indicates a stream membership for data units of the bitstream associated with the first attribute.

Optionally, in any of the preceding aspects, another implementation of the aspect provides, wherein the first attribute is organized into a plurality of layers, and wherein a third syntax element indicates a layer membership for data units of the bitstream associated with the first attribute.

Optionally, in any of the preceding aspects, another implementation of the aspect provides, wherein the second syntax element is a num_streams_for_attribute element contained in a group of frames header in the bitstream, and wherein the third syntax element is a num_layers_for_attribute element contained in the group of frames header in the bitstream.

Optionally, in any of the preceding aspects, another implementation of the aspect provides, wherein a fourth syntax element indicates a first layer of the plurality of layers contains data associated with an irregular point cloud.

Optionally, in any of the preceding aspects, another implementation of the aspect provides, wherein the fourth syntax element is a regular_points_flag element contained in a group of frames header in the bitstream.

In an embodiment, the disclosure includes a video coding device comprising a processor, a receiver coupled to the processor, and a transmitter coupled to the processer, the processor, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes an encoder comprising a first attribute encoding means and a second attribute encoding means for encoding a plurality of PCC attributes of a sequence of PCC frames into a bitstream with a plurality of codecs, wherein the plurality of PCC attributes include geometry, texture, and one or more of reflectance, transparency, and normal, and wherein each coded PCC frame is represented by one or more PCC NAL units. The encoder further comprises a syntax encoding means for encoding for each PCC attribute, an indication of one of the video codecs used to code the corresponding PCC attribute. The encoder further comprises a transmitting means for transmitting the bitstream toward a decoder.

Optionally, in any of the preceding aspects, another implementation of the aspect provides, wherein the encoder is further configured to perform the method of any of the preceding aspects.

In an embodiment, the disclosure includes a decoder comprising a receiving means for receiving a bitstream comprising a plurality of coded sequences of PCC frames, wherein the plurality of coded sequences of PCC frames represent a plurality of PCC attributes including geometry, texture, and one or more of reflectance, transparency, and normal, and wherein each coded PCC frame is represented by one or more PCC NAL units. The decoder further comprises a parsing means for parsing the bitstream to obtain, for each PCC attribute, an indication of one of a plurality of video codecs used to code the corresponding PCC attribute. The decoder further comprises a decoding means for decoding the bitstream based on the indicated video codecs for the PCC attributes.

Optionally, in any of the preceding aspects, another implementation of the aspect provides, wherein the decoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
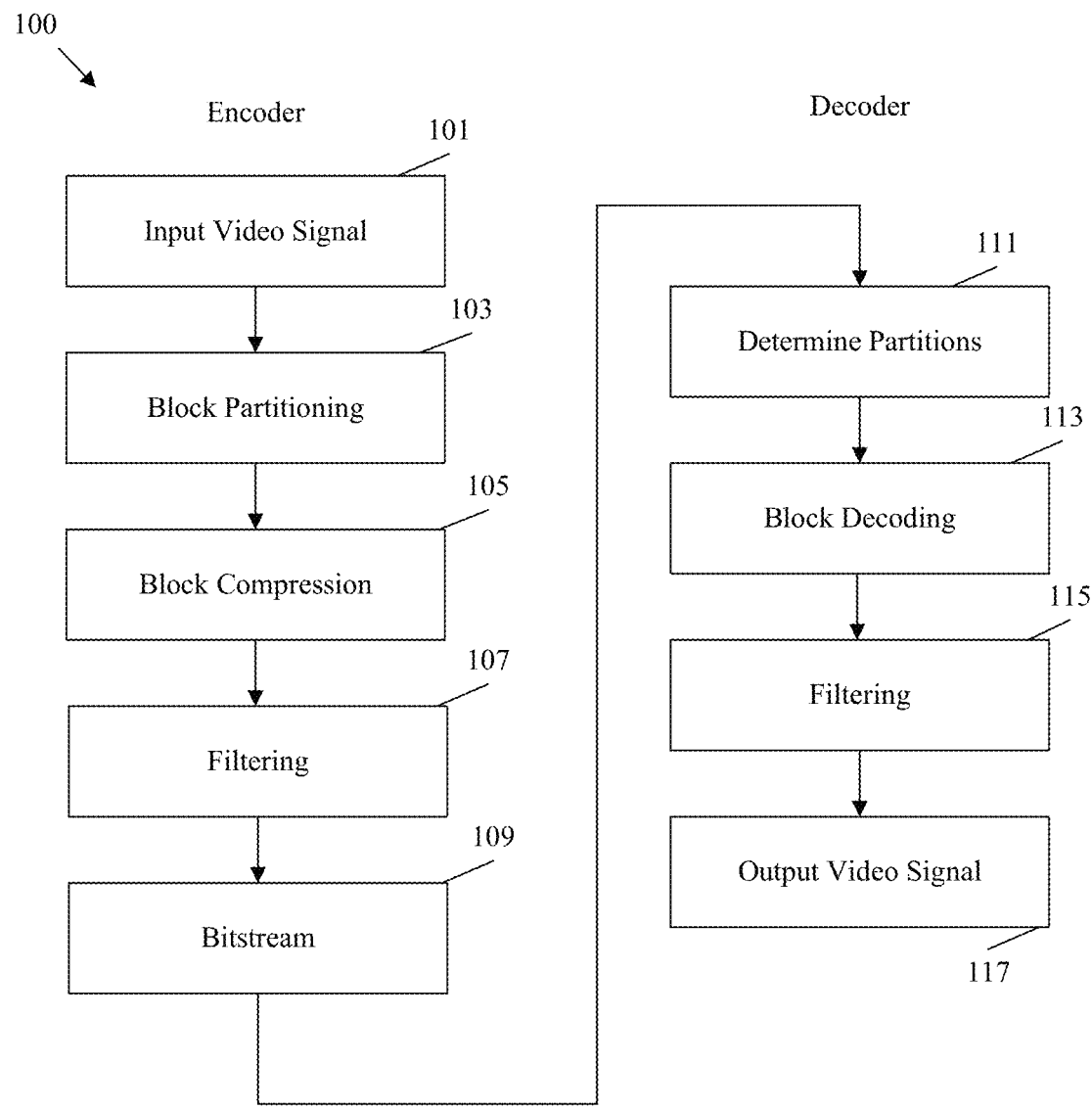
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded (P or B) slice of a picture may be coded by employing spatial prediction with respect to reference samples in neighboring blocks in the same picture or temporal prediction with respect to reference samples in other reference pictures. Pictures may be referred to as frames, and reference pictures may be referred to as reference frames. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array.

The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-K1001-v4 and JVET-K1002-v1.

PCC is a mechanism for encoding video of 3D objects. A point cloud is a set of data points in the 3D space. Such data points include parameters that determine, for example, a position in space and a color. Point clouds may be used in various applications such as real-time 3D immersive telepresence, content virtual reality (VR) viewing with interactive parallax, 3D free viewpoint sport replays broadcasting, geographic information systems, cultural heritage, autonomous navigation based on large-scale 3D dynamic maps, and automotive applications. The ISO/IEC MPEG codec for PCC may operate on lossless and/or lossy compressed point cloud data with substantial coding efficiency and robustness to network environments. The use of this codec allows point clouds to be manipulated as a form of computer data, stored on various storage media, transmitted and received over networks, and distributed on broadcasting channels. The PCC coding environment is classified into PCC category 1, PCC category 2, and PCC category 3. The present disclosure is directed toward PCC category 2, which is related to MPEG output documents N17534 and N17533. The design of the PCC category 2 codec seeks to leverage other video codecs to compress the geometry and texture information of a dynamic point cloud by compressing the point cloud data as a set of different video sequences. For example, two video sequences, one representing the geometry information of the point cloud data and another representing the texture information can be generated and compressed by using one or more video codecs. Additional metadata to support interpretation of the video sequences (e.g., an occupancy map and auxiliary patch information) can also be generated and compressed separately.

PCC systems may support a geometry PCC attribute containing position data and a texture PCC attribute containing color data. However, some video applications may include other types of data, such as reflectance, transparency, and normal vectors. Some of these types of data may be more efficiently coded using certain codecs than others. However, PCC systems may require that an entire PCC stream, and hence all PCC attributes, be encoded by the same codec. Further, a PCC attribute may be split into multiple layers. Such layers may then be combined and/or coded into one or more PCC attribute streams. For example, layers of an attribute can be coded according to a temporally interleaved coding scheme where a first layer is coded in PCC access units (AUs) with even values of picture output order and a second layer is coded in PCC AUs with odd values of picture output order. As there may be zero to four streams for each attribute and various layer combinations of such streams, proper identification of streams and layer may become a challenge. However, PCC systems may be unable to determine how many layers are coded or combined with a PCC attribute stream in a given PCC bitstream. Furthermore, PCC systems may not have a mechanism for indicating the manner of combination of the layers and/or indicating correspondences between such layers and PCC attribute streams. Finally, patches are employed to code PCC video data. For example, a three dimensional (3D) PCC object can be represented as a set of two dimensional (2D) patches. This allows PCC to operate in conjunction with video codec, which are designed to encode 2D video frames. However, some points in a point cloud may not be captured by a patch in some cases. For example, an isolated point in a 3D space may be difficult to code as part of a patch. The only patch that would make sense in such a case would be a one pixel by one pixel patch that just contains the single point, which would significantly increase signaling overhead in the case of many such points. Instead, an irregular point cloud can be used, which is a special patch that contains multiple isolated points. A different approach is used for signaling attributes for an irregular point cloud patch than for other patch types. However, PCC systems may be unable to indicate that a PCC attribute layer carries irregular point cloud points/patches.

Disclosed herein are mechanisms to improve PCC by addressing the issues mentioned above. In one embodiment, a PCC system may employ different codecs for coding different PCC attributes. Specifically, a separate syntax element can be employed to identify the video codec for each attribute. In another embodiment, the PCC system explicitly signals the number of layers that are coded and/or combined to represent each PCC attribute stream. In addition, the PCC system may employ syntax elements to signal the mode used for coding and/or combining the layers of the PCC attribute within the PCC attribute stream. Further, the PCC system may employ syntax element(s) to specify the layer index of the layer associated with each data unit of the corresponding PCC attribute stream. In yet another embodiment, a flag can be employed for each PCC attribute layer to indicate whether the PCC attribute layer carriers any irregular point cloud points. Such embodiments can be used alone or in conjunction. Further, such embodiments allow PCC systems to employ more complex coding mechanisms in a manner that is recognizable by a decoder, and hence decodable by the decoder. These and other examples are described in detail below.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row.

Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
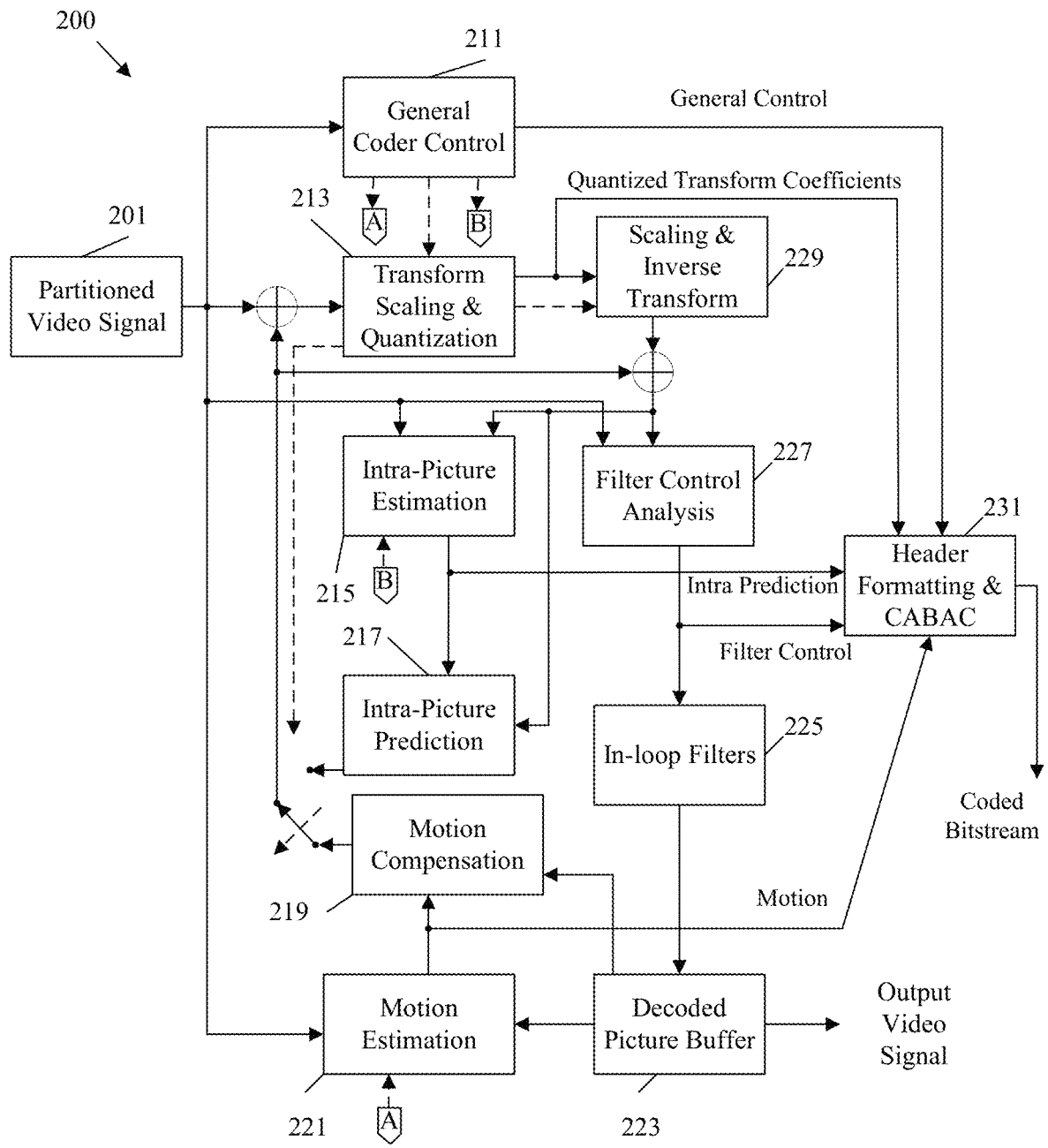
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
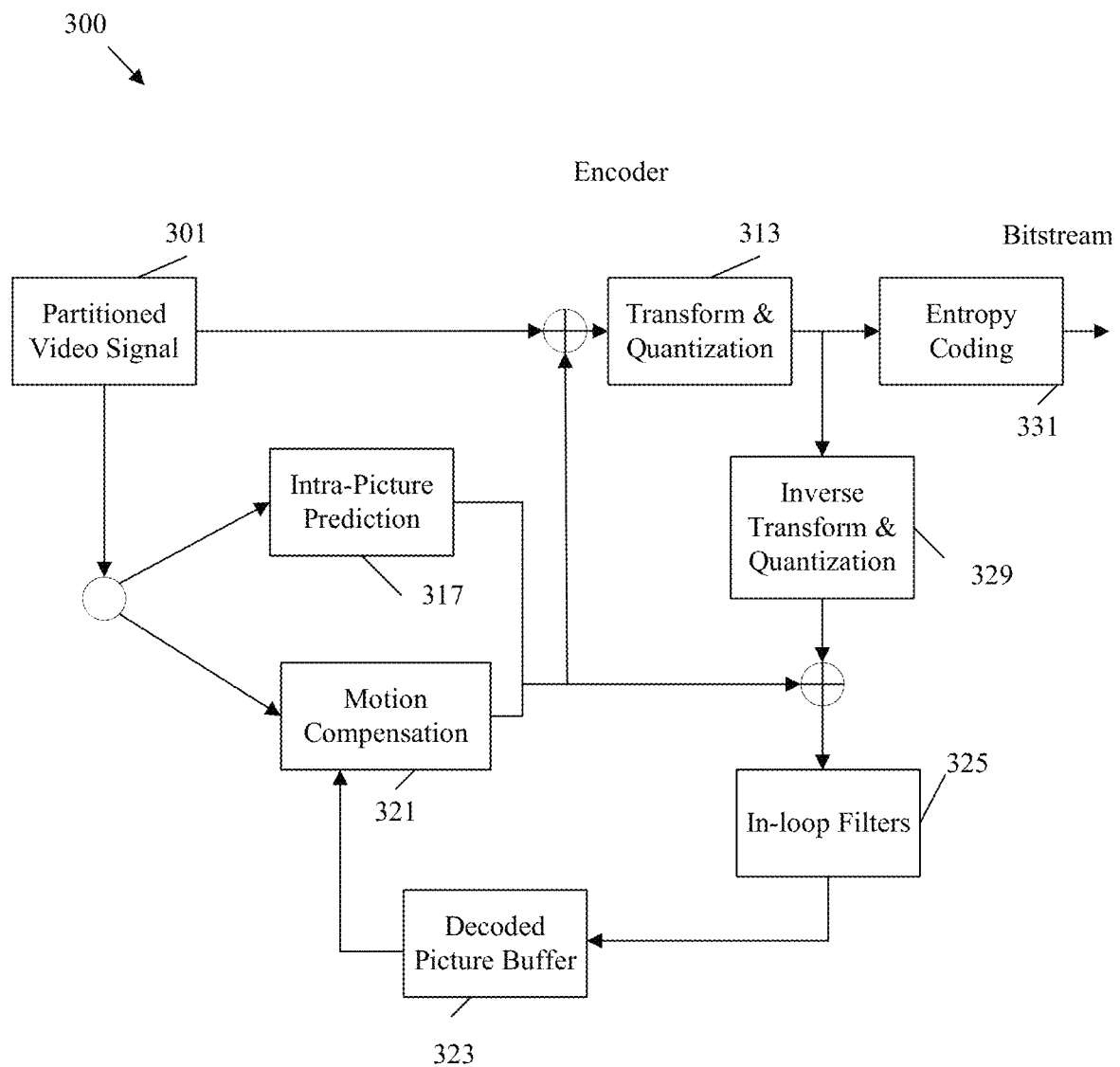
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
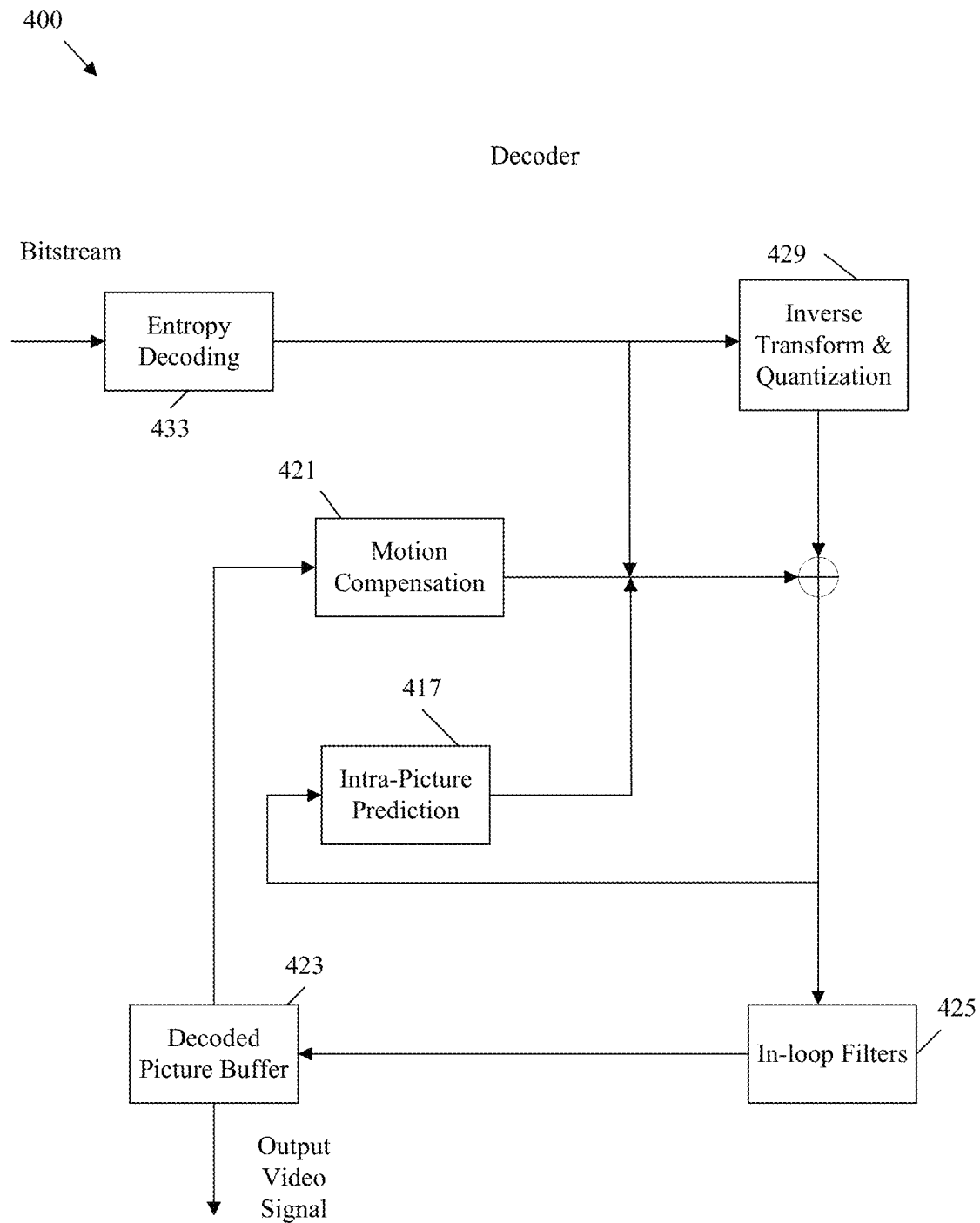
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
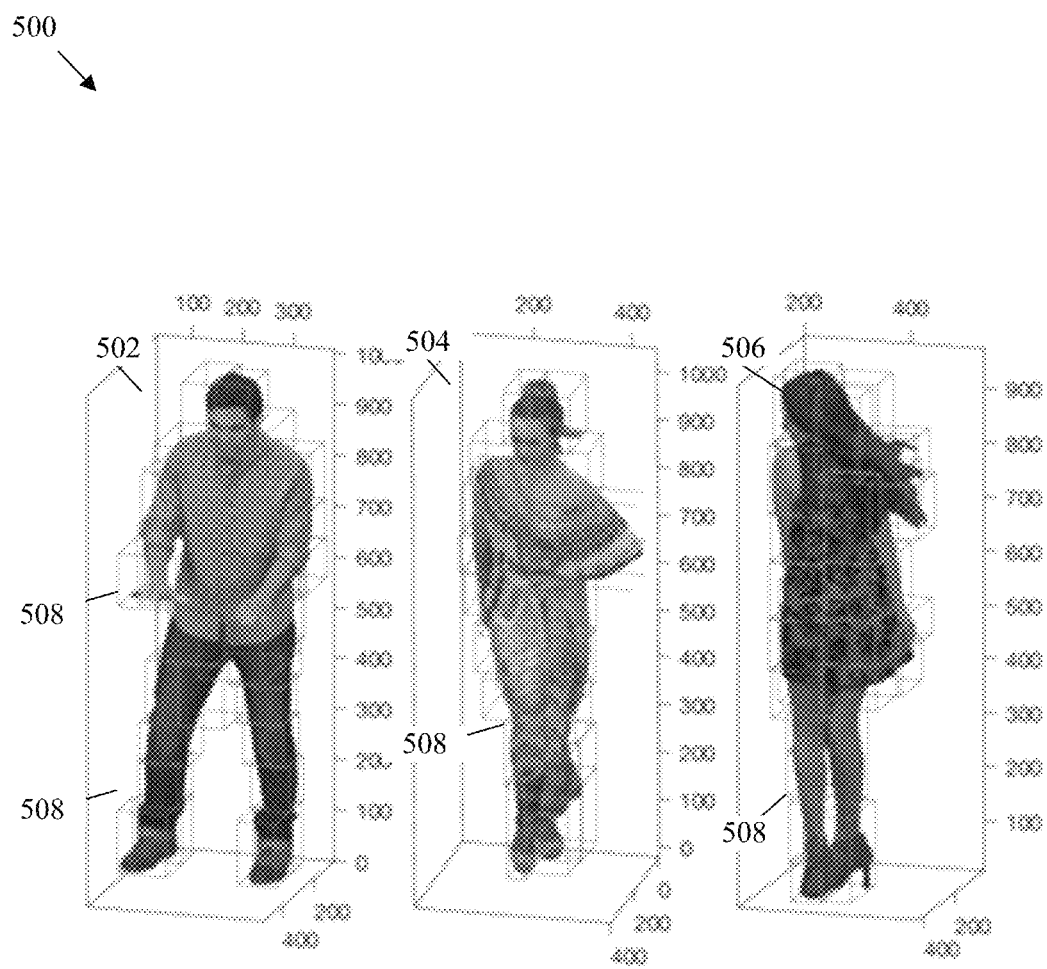
FIG. 5 is an example of point cloud media that can be coded according to PCC mechanisms.

FIG. 5 is an example of point cloud media 500 that can be coded according to PCC mechanisms. A point cloud is a set of data points in space. Point clouds may be produced by 3D scanners, which measure a large number of points on the external surfaces of objects around them. A point cloud can be described in terms of a geometry attribute, a texture attribute, a reflectance attribute, a transparency attribute, a normal attribute, etc. Each attribute can be coded by a codec, such as a video codec system 200, an encoder 300, and/or a decoder 400, as part of method 100. Specifically, each attribute of a PCC frame can be coded separately at an encoder and decoded and recombined at the decoder to recreate the PCC frame.

The point cloud media 500 includes three bounding boxes 502, 504, and 506. Each of the bounding boxes 502, 504, and 506 represents a portion or segment of a 3D image from a current frame. While the bounding boxes 502, 504, and 506 contain a 3D image of a person, other objects may be included in the bounding boxes in practical applications. Each bounding box 502, 504, and 506 includes an x-axis, a y-axis, and z-axis that indicates a number of pixels occupied by the 3D image in the x, y, and z directions, respectively. For example, the x-axis and the y-axis depict about four-hundred pixels (e.g., from about 0-400 pixels) while the z-axis depicts about one-thousand pixels (e.g., from about 0-1000 pixels).

Each of the bounding boxes 502, 504, and 506 contains one or more patches 508, which are represented by cubes or boxes in FIG. 5. Each patch 508 contains a portion of the overall object within one of the bounding boxes 502, 504, or 506 and may be described or represented by patch size information. The patch information may include, for example, two-dimensional (2D) and/or three-dimensional (3D) coordinates describing a location of the patch 508 within the bounding box 502, 504, or 506. The patch information may also include other parameters. For example, the patch information may include parameters such as a normalAxis, which is inherited for current patch information from a reference patch information. That is, one or more parameters from the patch information of the reference frame may be inherited for the patch information of the current frame. In addition, one or more metadata parts (e.g., patch rotation, a scale parameter, a material identifier, etc.) from the reference frame may be inherited by the current frame. The patches 508 may be interchangeably referred to herein as 3D patches or patch data units. A list of the patches 508 in each bounding box 502, 504, or 506 may be generated and stored in a patches buffer in descending order from the largest patch to the smallest patch. The patches can then be encoded by the encoder and/or decoded by the decoder.

The patches 508 can describe the various attributes of the point cloud media 500. Specifically, the position of each pixel on the x-axis, y-axis, and z-axis is that pixel's geometry. Patches 508 containing the position of all of the pixels in the current frame can be coded to capture the geometry attribute for the current frame of the point cloud media 500. Further, each pixel may include a color value in the red, blue, and green (RGB) and/or the luminance and chrominance (YUV) spectrum. Patches 508 containing the color of all the pixels in the current frame can be coded to capture the texture attribute for the current frame of the point cloud media 500.

In addition, each pixel may (or may not) include some reflectance. Reflectance is an amount of light (e.g., colored light) that projects from a pixel to adjacent pixels. Shiny objects have a high reflectance, and hence spread the light/color of their corresponding pixels on other nearby pixel. Meanwhile matte objects have little or no reflectance, and may not affect the color/light level of adjacent pixels. Patches 508 containing the reflectance of all the pixels in the current frame can be coded to capture the reflectance attribute for the current frame of the point cloud media 500. Some pixels may also be partially to completely transparent (e.g., glass, clear plastic, etc.) Transparency is the amount of light/color of an adjacent pixel that can pass through a current pixel. Patches 508 containing the level of transparency of all of the pixels in the current frame can be coded to capture the transparency attribute for the current frame of the point cloud media 500. Further, the points of a point cloud media may create surfaces. A surface can be associated with a normal vector, which is a vector that is perpendicular to the surface. Normal vectors may be useful when describing object motion and/or interaction. Accordingly, in some cases a user may wish to encode normal vectors for surfaces to support additional functionality. Patches 508 containing the normal vectors for the surface(s) in the current frame can be coded to capture the normal attribute for the current frame of the point cloud media 500.

The geometry, texture, reflectance, transparency, and normal attribute can contain data describing some or all data points in a point cloud media 500, depending on the example. For example, the reflectance, transparency, and normal attributes are optional, and hence may occur individually or in combination for some point cloud media 500 examples and not for others, even in the same bitstream. As such, the number of patches 508, and further the number of attributes may vary from frame to frame and from video to video based on the filmed subject matter, video settings, etc.

Figure 6:
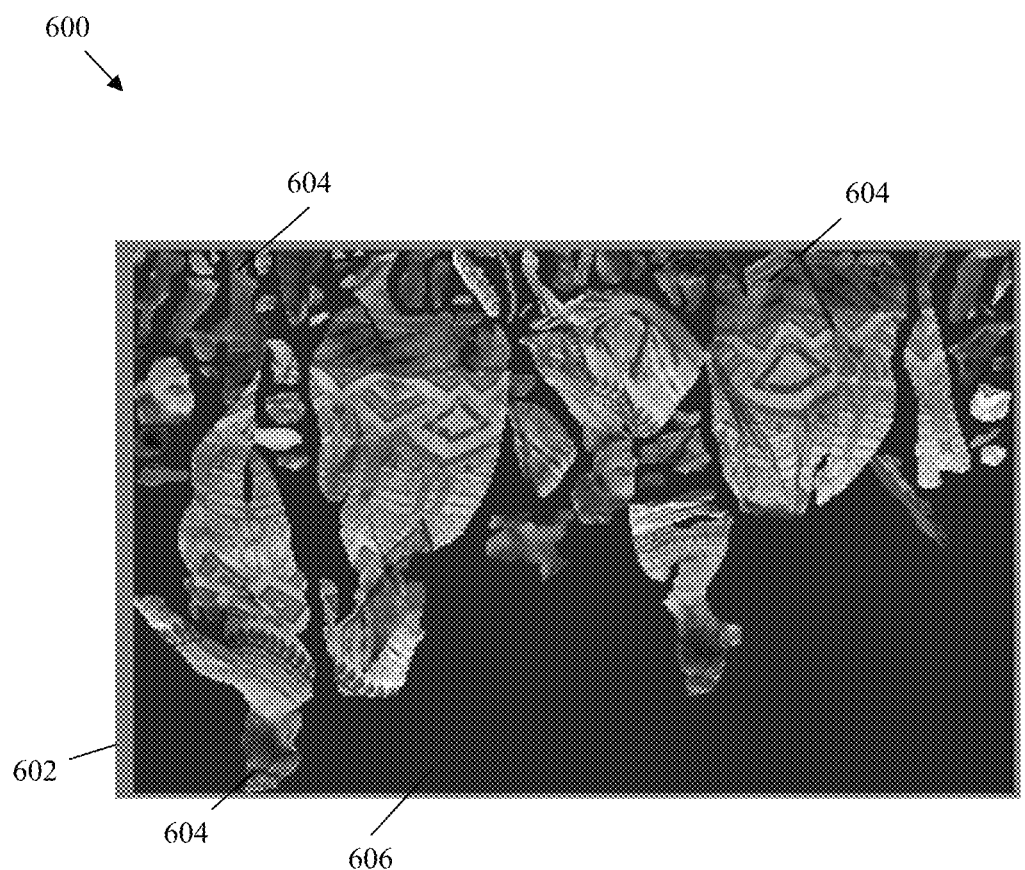
FIG. 6 is an example of data segmentation and packing for a point cloud media frame.

FIG. 6 is an example of data segmentation and packing for a point cloud media frame 600. Specifically, the example of FIG. 6 depicts a 2D representation of the patches 508 of point cloud media 500. The point cloud media frame 600 includes a bounding box 602 corresponding to the current frame from a video sequence. The bounding box 602 is 2D as opposed to the bounding boxes 502, 504, and 506 of FIG. 5, which are 3D. As shown, the bounding box 602 contains numerous patches 604. The patches 604 may be interchangeably referred to herein as 2D patches or patch data units. Collectively, the patches 604 in FIG. 6 are a representation of the image in bounding box 504 from FIG. 5. As such, the 3D image in the bounding box 504 in FIG. 5 is projected onto the bounding box 602 via the patches 604. The portions of the bounding box 602 that do not contain one of the patches 604 are referred to as empty space 606. The empty space 606 may also be referred to as void spaces, empty samples, etc.

Keeping the above in mind, it should be noted that video-based point cloud compression (PCC) codec solutions are based on the segmentation of 3D point cloud data (e.g., the patches 508 of FIG. 5) into 2D projection patches (e.g., the patches 604 of FIG. 6). Indeed, the coding methodology or process described above may be beneficially implemented for various types of technology such as, for example, immersive six degrees of freedom (6 DoF), dynamic Augmented Reality/Virtual Reality (AR/VR) objects, cultural heritage, Graphic Information Systems (GIS), Computer Aided Design (CAD), autonomous navigation, and so on.

The location for each patch (e.g., one of the patches 604 of FIG. 6) within the bounding box (e.g., the bounding box 602) can be determined by the size of the patch alone. For example, the largest of the patches 604 in FIG. 6 is projected onto the bounding box 602 first starting from top-left corner (0, 0). After the largest of the patches 604 has been projected onto the bounding box 602, the next-largest of the patches 604 is projected onto (a.k.a., filled into) the bounding box 602, and so on until the smallest of the patches 604 has been projected onto the bounding box 602. Again, only the size of each patch 604 is considered with this process. In some cases, patches 604 having a smaller size may occupy the space between larger patches and may end up having a position closer to the top, left corner of the bounding box 602 than the larger patches 604. During encoding, this process may be repeated for each relevant attribute until patches for each attribute in a frame are encoded into one or more corresponding attribute streams. The group of data units in the attribute streams that are used to recreate a single frame can then be stored in a bitstream in a PCC AU. At the decoder, these attribute streams are obtained from the PCC AU and decoded to create the patches 604. Such patches 604 can then be combined to recreate the PCC media. As such, the point cloud media frame 600 can be coded by a codec, such as a video codec system 200, an encoder 300, and/or or a decoder 400, as part of method 100 to compress the point cloud media 500 for transmission.

Figure 7:
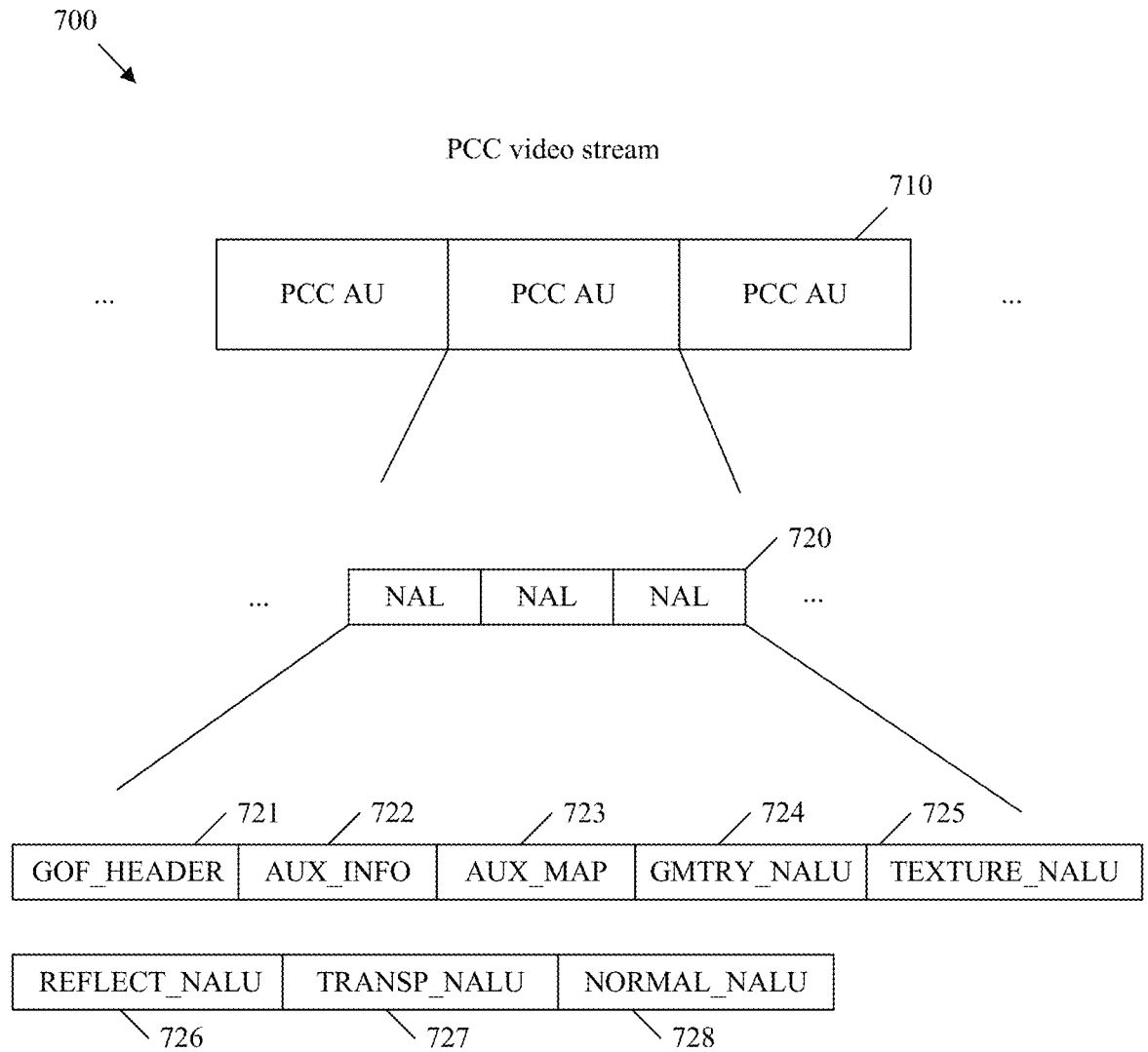
FIG. 7 is a schematic diagram illustrating an example PCC video stream with an expanded attribute set.

FIG. 7 is a schematic diagram illustrating an example PCC video stream 700 with an expanded attribute set. For example, a PCC video stream 700 may be created when a point cloud media frame 600 from point cloud media 500 is encoded according to method 100, for example by employing a video codec system 200, an encoder 300, and/or a decoder 400.

The PCC video stream 700 includes a sequence of PCC AUs 710. A PCC AU 710 includes sufficient data to reconstruct a single PCC frame. Data is positioned into PCC AUs 710 in NAL units 720. A NAL unit 720 is a packet sized data container. For example, a single NAL unit 720 is generally sized to allow for simple network transmission. A NAL unit 720 may contain a header indicating the NAL unit 720 type and a payload that contains the associated video data. The PCC video stream 700 is designed for an expanded attribute set, and hence contains several attribute specific NAL units 720.

The PCC video stream 700 may include a group of frames (GOF) header 721, an auxiliary information frame 722, an occupancy map frame 723, a geometry NAL unit 724, a texture NAL unit 725, a reflection NAL unit 726, a transparency NAL unit 727, and a normal NAL unit 728, each of which is a type of NAL unit 720. The GOF header 721 contains various syntax elements describing the corresponding PCC AU 710, the frame associated with the corresponding PCC AU 710, and/or other NAL units 720 in the PCC AU 710. A PCC AU 710 may contain a single GOF header 721 or may contain no GOF header 721, depending on the example. The auxiliary information frame 722 may contain metadata relevant to the frame, such as information related to the patches used to encode the attributes. The occupancy map frame 723 may contain further metadata relevant to the frame, such as an occupancy map indicating areas of the frame that are occupied with data versus areas of the frame that are empty. The remaining NAL units 720 contain the attribute data for the PCC AU 710. Specifically, the geometry NAL unit 724, texture NAL unit 725, reflection NAL unit 726, transparency NAL unit 727, and normal NAL unit 728 contain the geometry attribute, texture attribute, reflection attribute, transparency attribute, and normal attribute, respectively.

As noted above, the attributes can be organized into streams. For example, there may be from zero to four streams for each attribute. A stream may include logically separate portions of the PCC video data. For example, an attribute for different objects may be encoded into multiple attribute streams of the same type (e.g., a first geometry stream for a first 3D bound box, a second attribute stream for a second 3D bound box, etc.) In another example, an attribute associated with different frames may be encoded into multiple attribute streams (e.g., a transparency attribute stream for even frames and a transparency attribute stream for odd frames). In yet another example, patches may be placed in layers to represent a 3D object. Accordingly, separate layers may be included in separate streams (e.g., a first texture attribute stream for a top layer, a second texture attribute stream for a second layer, etc.) Regardless of the example, a PCC AU 710 may contain zero, one, or a plurality of NAL units for a corresponding attribute.

The present disclosure supports increased flexibility for coding the various attributes (e.g., as included in the geometry NAL unit 724, the texture NAL unit 725, the reflection NAL unit 726, the transparency NAL unit 727, and/or the normal NAL unit 728). In a first example, different codecs can be employed for coding different PCC attributes. As a specific example, a first codec can be employed to code the geometry of a PCC video into the geometry NAL units 724, while a second codec is employed to code the reflection of the PCC video into the reflection NAL units 726. As another example, up to five codecs could be employed in coding a PCC video (e.g., one codec for each attribute). The codec(s) used for the attribute(s) can then be signaled as syntax element(s) in the PCC video stream 700, for example in the GOF header 721.

Further, as noted above, the PCC attributes may employ many combinations of layers and/or streams. Accordingly, syntax element(s) (e.g., in the GOF header 721) can be used to signal the layer and/or stream combinations used by the encoder when encoding each attribute in order to allow the decoder to determine the layer and/or stream combinations for each attribute when decoding. Further, syntax elements (e.g., in the GOF header 721) can be used to signal the mode used for coding and/or combining the layers of the PCC attribute within the PCC attribute stream. In addition, the syntax element(s) (e.g., in the GOF header 721) can be used to specify the layer index of the layer associated with each NAL unit 720 corresponding to a PCC attribute stream. For example, the GOF header 721 can be used to signal the number of layers and streams that are associated with the geometry attribute, the manner in which such layers and streams are arranged, and a layer index for each geometry NAL unit 724 so that the decoder can assign each geometry NAL unit 724 to the proper layer when decoding a PCC frame.

Finally, a flag (e.g., in the GOF header 721) can indicate whether any PCC attribute layer contains any irregular point cloud points. An irregular point cloud is a set of one or more data points that are non-contiguous with adjacent data points, and hence cannot be represented in a 2D patch such as a patch 604. Instead, such points are represented as part of an irregular point cloud patch which contains coordinates and/or translation parameters associated with such irregular point cloud points. As irregular point clouds are represented using different data structures than 2D patches, the flag allows the decoder to properly recognize the presence of an irregular point cloud and to select the appropriate mechanisms to decode such data.

The following is an example mechanism for implementing the abovementioned aspects. Definitions: A video NAL unit is a PCC NAL unit that has PccNalUnitType equal to GMTRY_NALU, TEXTURE_NALU, REFLECT_NALU, TRANSP_NALU, or NORMAL_NALU.

Bitstream formats: This clause specifies the relationship between the NAL unit stream and byte stream, either of which are referred to as the bitstream. The bitstream can be in one of two formats: the NAL unit stream format or the byte stream format. The NAL unit stream format is conceptually the more basic type, and includes a sequence of syntax structures called PCC NAL units. This sequence is ordered in decoding order. There are constraints imposed on the decoding order (and contents) of the PCC NAL units in the NAL unit stream. The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes. The byte stream format is similar to the format employed in HEVC and AVC.

The PCC NAL unit header syntax may be implemented as described in Table 1 below.

TABLE 1

PCC NAL unit header syntax

| | Descriptor |
|---|---|
| pcc_nal_unit_header( ) { | |
|   forbidden_zero_bit | f(1) |
|   pcc_nal_unit_type_plus1 | u(5) |
|   pcc_stream_id | u(2) |
| } | |

The group of frames header raw byte sequence payload (RBSP) syntax may be implemented as described in Table 2 below.

TABLE 2 group of frames header RBSP syntax

| | Descriptor |
|---|---|
| group_of_frames_header_rbsp( ) { | |
|   num_attributes | u(5) |
|   if( num_attributes > 1 ) | |
|     attributes_first_ordering_flag | u(1) |
|   for( i = 0; i < num_attributes; i++ ) { | |
|     attribute_type[ i ] | u(5) |
|     identified_codec_for_attribute[ i ] | u(8) |
|     num_streams_for_attribute[ i ] | u(2) |
|     num_layers_for_attribute[ i ] | u(4) |
|     for( j = 0; j < num_streams_for_attribute[ i ]; j++ ) { | |
|       max_attribute_layer_idx[ i ][ j ] | u(4) |
|       if( ( j == 0 && max_attribute_layer_idx[ i ][ j ] > 0 ) \|\| | |
|         ( j > 0 && max_attribute_layer_idx[ i ][ j ] > | |
|         ( max_attribute_layer_id[ i ][ j - 1 ] + 1 ) ) ) | |
|         attribute_layers_combination_mode[ i ][ j ] | u(4) |
|     } | |
|     for( j = 0; j < num_layers_for_attribute[ i ]; j++ ) | |
|       regular_points_flag[ i ][ j ] | u(1) |
|   } | |
|   byte_alignment( ) | |
|   pcc_profile_level( ) | |
|   frame_width | u(16) |
|   frame_height | u(16) |
|   occupancy_resolution | u(8) |
|   radius_to_smoothing | u(8) |
|   neighbor_count_smoothing | u(8) |
|   radius2_boundary_detection | u(8) |
|   threshold_smoothing | u(8) |
|   lossless_geometry | u(8) |
|   lossless_texture | u(8) |
|   no_attributes | u(8) |
|   lossless_geometry_444 | u(8) |
|   absolute_d1_coding | u(8) |
|   binary_arithmetic_coding | u(8) |
|   gof_header_extension_flag | u(1) |
|   if( gof_header_extension_flag ) | |
|     while( more_rbsp_data( ) ) | |
|       gof_header_extension_data_flag | u(1) |
|   rbsp_trailing_bits( ) | |
| } | |

The PCC profile and level syntax may be implemented as described in Table 3 below.

TABLE 3

PCC Profile Syntax

| | Descriptor |
|---|---|
| pcc_profile_level( ) { | |
|   pcc_profile_idc | u(5) |
|   pcc_pl_reserved_zero_19bits | u(19) |
|   pcc_level_idc | u(8) |
|   for( i = 0; i < num_attributes; i++ ) | |
|     if( identified_codec_for_attribute[ i ] == CODEC_HEVC ) | |
|       hevc_ptl_12bytes_attribute[ i ] | u(96) |
|     else if( identified_codec_for_attribute[ i ] == CODEC_AVC ) | |
|       avc_pl_3bytes_attribute[ i ] | u(24) |
| } | |

The PCC NAL unit header semantics may be implemented as follows. A forbidden_zero_bit may be set equal to zero. The pcc_nal_unit_type_plus1 minus 1 specifies the value of the variable PccNalUnitType, which specifies the type of RBSP data structure contained in the PCC NAL unit as specified in Table 4 below. The variable NalUnitType is specified as follows:

PccNalUnitType=pcc_nal_unittype_plus1−1    (7-1)

PCC NAL units that have nal_unit_type in the range of UNSPEC25 . . . UNSPEC30, inclusive, for which semantics are not specified, shall not affect the decoding process specified herein. It should be noted that PCC NAL unit types in the range of UNSPEC25 . . . UNSPEC30 may be used as determined by the application. No decoding process for these values of PccNalUnitType is specified in this disclosure. Since different applications might use these PCC NAL unit types for different purposes, particular care should be exercised in the design of encoders that generate PCC NAL units with these PccNalUnitType values and in the design of decoders that interpret the content of PCC NAL units with these PccNalUnitType values. This disclosure does not define any management for these values. These PccNalUnitType values might only be suitable for use in contexts in which collisions of usage (e.g., different definitions of the meaning of the PCC NAL unit content for the same PccNalUnitType value) are unimportant, not possible, are managed—e.g., defined or managed in the controlling application or transport specification, or by controlling the environment in which bitstreams are distributed.

For purposes other than determining the amount of data in the PCC AUs of the bitstream, decoders may ignore (remove from the bitstream and discard) the contents of all PCC NAL units that use reserved values of PccNalUnitType. This requirement may allow future definition of compatible extensions to this disclosure.

TABLE 4

PCC NAL unit type codes

| PccNalUnitType | Name of PccNalUnitType | Content of PCC NAL unit and/or RBSP syntax structure |
|---|---|---|
| 0 | GOF_HEADER | Group of frames header group_of_frames_header_rbsp( ) |
| 1 | AUX_INFO | Auxiliary information frame auxiliary_info_frame_rbsp( ) |
| 2 | OCP_MAP | Occupancy map frame occupancy_map_frame_rbsp( ) |
| 3 | GMTRY_NALU | The payload of this PCC NAL unit contains a NAL unit of the |

TABLE 4-continued

PCC NAL unit type codes

| PccNalUnitType | Name of PccNalUnitType | Content of PCC NAL unit and/or RBSP syntax structure |
|---|---|---|
| 4 | TEXTURE_NALU | geometry attribute per the identified video codec. The payload of this PCC NAL unit contains a NAL unit of the texture attribute per the identified video codec. |
| 5 | REFLECT_NALU | |
| 6 | TRANSP_NALU | |
| 7 | NORMAL_NALU | |
| 8..24 | RSV_8..RSV_24 | Reserved |
| 25..30 | UNSPEC25.. UNSPEC30 | Unspecified |

The identified video codec (e.g., HEVC or AVC) is indicated in the group of frames header NAL unit that is present in the first PCC AU of each cloud point stream (CPS). The pcc_stream_id specifies the PCC stream identifier (ID) for the PCC NAL unit. When PccNalUnitType is equal to GOF_HEADER, AUX_INFO, or OCP_MAP, the value of pcc_stream_id is set equal to zero. In the definition of one or more sets of PCC profiles and levels, the value of pcc_stream_id may be constrained to be less than four.

The order of PCC NAL units and their association to PCC AUs is described below. A PCC AU includes of zero or one group of frame header NAL units, one auxiliary information frame NAL unit, one occupancy map frame NAL unit, and one or more video AUs carrying data units of PCC attributes such as geometry, texture, reflection, transparency, or normal. Let video_au(i, j) denote a video AU with pcc_stream_id equal to j for the PCC attribute with PCC attribute ID equal to attribute_type[i]. The video AUs present in a PCC AU may be ordered as follows. If attributes_first_ordering_flag is equal to one, for any two video AUs video_au(i1, j1) and video_au(i2, j2) present in a PCC AU, the following applies. If i1 is less than i2, video_au(i1, j1) shall precede video_au(i2, j2) regardless of the values of j1 and j2. Otherwise if it is equal to i2 and j1 is greater than j2, video_au(i1, j1) shall follow video_au(i2, j2).

Otherwise (e.g., attributes_first_ordering_flag is equal to zero), for any two video AUs video_au(i1, j1) and video_au (i2, j2) present in a PCC AU, the following applies. If j1 is less than j2, video_au(i1, j1) shall precede video_au(i2, j2) regardless of the values of it and i2. Otherwise if j 1 is equal to j2 and it is greater than i2, video_au(i1, j1) shall follow video_au(i2, j2). The above order of video AU results in the following. If attributes_first_ordering_flag is equal to one, the order of the video AUs, when present, within a PCC AU is as follows (in the order listed), wherein within a PCC AU, all PCC NAL units of each particular PCC attribute, when present, are contiguous in decoding order without being interleaved with PCC NAL units of other PCC attributes:

video_au(0, 0), video_au(0, 1), . . . , video_au(0, num_streams_for_attribute[0]), video_au(1, 0), video_au(1, 1), . . . , video_au(1, num_streams_for_attribute[1]),

. . .

video_au(num_attributes−1, 0), video_au(num_attributes−1, 1), . . . , video_au(num_attributes−1, num_streams_for_attribute[1]).

Otherwise (attributes_first_ordering_flag is equal to zero), the order of the video AUs, when present, within a PCC AU is as follows (in the order listed), wherein within a PCC AU, all PCC NAL units of each particular pcc_stream_id value, when present, are contiguous in decoding order without being interleaved with PCC NAL units of other pcc_stream_id values:

video_au(0, 0), video_au(1, 0), . . . , video_au(num_attributes−1, 0), video_au(0, 1), video_au(1, 1), . . . , video_au(num_attributes−1, 1),

. . .

video_au(0, num_attribute[1]), video_au(1, num_streams_for_attribute[1]), . . . , video_au(num_attributes−1, num_streams_for_attribute[1]).

Association of NAL units to a video AU and the order of NAL units within a video AU are specified in the specification of the identified video codec, e.g., HEVC or AVC. The identified video codec is indicated in the frames header NAL unit that is present in the first PCC AU of each CPS.

The first PCC AU of each CPS starts with a group of frames header NAL unit, and each group of frames header NAL unit specifies the start of a new PCC AU.

Other PCC AUs start with an auxiliary information frame NAL unit. In other words, an auxiliary information frame NAL unit, when not preceded by a group of frames header NAL unit, starts a new PCC AU.

The group of frames header RBSP semantics are as follows. The num_attributes specifies the maximum number of PCC attributes (such as geometry, texture, etc.) that may be carried in the CPS. Note that in the definition of one or more sets of PCC profiles and levels, the value of num_attributes may be constrained to be equal to five or less. The attributes_firstordering_flag, when set equal to zero, specifies that, within a PCC AU, all PCC NAL units of each particular PCC attribute, when present, are contiguous in decoding order without being interleaved with PCC NAL units of other PCC attributes. The attributes_first_ordering_flag, when set equal to zero, specifies that, within a PCC AU, all PCC NAL units of each particular pcc_stream_id value, when present, are contiguous in decoding order without being interleaved with PCC NAL units of other pcc_stream_id values. The attribute_type[i] specifies the PCC attribute type of the i-th PCC attribute. The interpretation of the different PCC attribute types is specified in Table 5 below. In the definition of one or more sets of PCC profiles and levels, the value of attribute_type[0] and attribute_type[1] may be constrained to be equal to zero and one, respectively.

TABLE 5

Specification of attribute_type[ i ]

| Value | Name of PCC attribute | The identified PCC attribute |
|---|---|---|
| 0 | ATTR_GEOMETRY | Geometry |
| 1 | ATTR_TEXTURE | Texture |
| 2 | ATTR_REFLECT | Reflectance |
| 3 | ATTR_TRANSP | Transparency |
| 4 | ATTR_NORMAL | Normal |
| 5..31 | CODEC_RSV_5.. CODEC_RSV_31 | Reserved |

The identified_codec_for_attribute[i] specifies the identified video codec used for coding of the i-th PCC attribute as shown in Table 6 below.

TABLE 6

Specification of identified_codec_for_attribute[ i ]

| Value | Name of identified_codec | The identified video codec |
|---|---|---|
| 0 | CODEC_HEVC | ISO/IEC IS 23008-2 (HEVC) |
| 1 | CODEC_AVC | ISO/IEC IS 14496-10 (AVC) |
| 2..255 | CODEC_RSV_2..<br>CODEC_RSV_255 | Reserved |

The num_streams_for_attribute[i] specifies the maximum number of PCC streams for the i-th PCC attribute. Note that in the definition of one or more sets of PCC profiles and levels, the value of num_streams_for_attribute[i] may be constrained to be less than or equal to four. The num_layers_for_attribute[i] specifies the number of attribute layers for the i-th PCC attribute. Note that in the definition of one or more sets of PCC profiles and levels, the value of num_layer_for_attribute[i] may be constrained to be less than or equal to four. The max_attribute_layer_idx[i][j] specifies the maximum value of the attribute layer index of the PCC stream with pcc_stream_id equal to j for the i-th PCC attribute. The value of max_attribute_layer_idx [i][j] should be less than num_layer_for_attribute[i]. The attribute_layers_combination_mode[i][j] specifies the attribute layers combination mode for the attribute layers carried in the PCC stream with pcc_stream_id equal to j for the i-th PCC attribute. The interpretation of the different values for attribute_layers_combination_mode[i][j] is specified in Table 7 below.

TABLE 7

Specification of attribute_layers_combination_mode[ i ][ j ]

| Value | Name of combination mode | The identified combination mode |
|---|---|---|
| 0 | COMBIN_MODE_TEMP_INTLV | Temporal interleaving mode, wherein each PCC AU contains one attribute layer of the PCC stream with pcc_stream_id equal to j for the i-th PCC attribute, and the attribute layers are temporally interleaved in different PCC AUs |
| 1..15 | COMBIN_MODE_RSV_1..<br>COMBIN_MODE_RSV_255 | Reserved |

When attribute_layers_combination_mode[i][j] is present and equal to zero, the variable attrLayerIdx[i][j], indicating the attribute layer index for the attribute layer of the PCC stream with pcc_stream_id equal to j for the i-th PCC attribute, the PCC NAL units of the attribute layer being carried in a video AU with picture order count value equal to PicOrderCntVal as specified in the specification of the identified video codec, is derived as follows.

tmpVal=PicOrderCntVal%num_streams_for_attribute[i]

if(j==0)

attrLayerId[i][j]=tmpVal else attrLayerId[i][j][k]=max_attribute_layer_id[i][j−1]+1+tmpVal (7-2)

The regular_points_flag[i][j], when equal to one, specifies that the attribute layer with layer index equal to j for the i-th PCC attribute carries regular points of a point cloud signal. The regular_points_flag[i][j], when set equal to zero, specifies that the attribute layer with the layer index equal to j for the i-th PCC attribute carries irregular points of a point cloud signal. Note that in the definition of one or more sets of PCC profiles and levels, the value of regular_points_flag[i][j] may be constrained to be zero. The frame_width indicates the frame width, in pixels, of the geometry and texture videos. The frame width should be a multiple of occupancyResolution. The frame height indicates the frame height, in pixels, of the geometry and texture videos. The frame height should be multiple of occupancyResolution. The occupancy_resolution indicates the horizontal and vertical resolution, in pixels, at which patches are packed in the geometry and texture videos. The occupancy_resolution should be an even value multiple of occupancyPrecision. The radius_to_smoothing indicates the radius to detect neighbours for smoothing. The value of radius_to_smoothing should be in the range of zero to two hundred fifty five inclusive.

The neighbor_count_smoothing indicates the maximum number of neighbors used for smoothing. The value of neighbor_count_smoothing should be in the range of zero to two hundred fifty five inclusive. The radius2_boundary_detection indicates the radius for boundary point detection. The value of radius2_boundary_detection should be in the range of zero to two hundred fifty five inclusive. The threshold_smoothing indicates the smoothing threshold. The value of threshold_smoothing should be in the range of zero to two hundred fifty five inclusive. The lossless_geometry indicates lossless geometry coding. The value of lossless_geometry, when equal to one, indicates that point cloud geometry information is coded losslessly. The value of lossless_geometry, when equal to zero, indicates that point cloud geometry information is coded in a lossy manner. The lossless_texture indicates lossless texture encoding. The value of lossless_texture, when equal to one, indicates that point cloud texture information is coded losslessly. The value of lossless_texture, when equal to zero, indicates that point cloud texture information is coded in a lossy manner. The lossless_geometry_444 indicates whether to use 4:2:0 or 4:4:4 video format for geometry frames. The value of lossless_geometry_444, when equal to one, indicates that the geometry video is coded in 4:4:4 format. The value of lossless_geometry_444, when equal to zero, indicates that the geometry video is coded in 4:2:0 format.

The absolute_d1_coding indicates how the geometry layers other than the layer nearest to the projection plane are coded. The absolute_d1_coding, when equal to one, indicates that the actual geometry values are coded for the geometry layers other than the layer nearest to the projection plane. The absolute_d1_coding, when equal to zero, indicates that the geometry layers other than the layer nearest to the projection plane are coded differentially. The bin_arithmetic_coding indicates whether binary arithmetic coding is used. The value of bin arithmetic coding, when equal to one, indicates that binary arithmetic coding is used for all the syntax elements. The value of bin_arithmetic_coding, when equal to zero, indicates that non-binary arithmetic coding is used for some syntax elements. The gof_header_extension_flag, when equal to zero, specifies that no gof_header_extension_data_flag syntax elements are present in the group of frames header RBSP syntax structure. The gof_header_extension_flag, when equal to one, specifies that there are gof_header_extension_data_flag syntax elements present in the group of frames header RBSP syntax structure. Decoders may ignore all data that follow the value one for the gof_header_extension_flag in a group of frames header NAL unit. The gof_header_extension_data_flag may have any value, and the presence and value of the flag do not affect decoder conformance. Decoders may ignore all gof_header_extension_data_flag syntax elements.

The PCC profile and level semantics are as follows. The pcc_profile_idc indicates a profile to which the CPS conforms. The pcc_pl_reserved_zero_19 bits is equal to zero in bitstreams conforming to this version of this disclosure. Other values for pcc_pl_reserved_zero_19 bits are reserved for future use by ISO/IEC. Decoders may ignore the value of pcc_pl_reserved_zero_19 bits. The pcc_level_idc indicates a level to which the CPS conforms. The hevc_ptl_12 bytes_attribute[i] may be equal to the value of the twelve bytes from general_profile_idc to general_level_idc, inclusive, in the active SPS when an HEVC bitstream for PCC attribute type equal to attribute_type[i] extracted as specified by the sub-bitstream extraction process is decoded by a conforming HEVC decoder. The avc_pl_3ytes_attribute[i] may be equal to the value of the three bytes from profile_idc to level_idc, inclusive, in the active SPS when an AVC bitstream for PCC attribute type equal to attribute_type[i] extracted as specified by the sub-bitstream extraction process is decoded by a conforming AVC decoder.

The sub-bitstream extraction process is as follows. Inputs to this process are a PCC bitstream inBitstream, a target PCC attribute type targetAttrType, and a target PCC stream ID value targetStreamId. The output of this process is a sub-bitstream. It may be a requirement of bitstream conformance for the input bitstream that any output sub-bitstream that is the output of the process specified in this clause with a conforming PCC bitsteam inBitstream, targetAttrType indicating any type of PCC attributes present in inBitstream, and targetStreamId less than or equal to the greatest PCC stream ID value of the PCC streams present in inBitstream for the attribute type targetAttrType shall be a conforming video bitstream per the identified video codec specification for the attribute type targetAttrType.

The output sub-bitstream is derived by the following ordered steps. Depending on the value of targetAttrType, the following applies. If targetAttrType is equal to ATTR_GEOMETRY, all PCC NAL units with PccNalUnitType not equal to GMTRY_NALU or pcc_stream_id not equal to targetStreamId are removed. Otherwise, if targetAttrType is equal to ATTR_TEXTURE, all PCC NAL units with PccNalUnitType not equal to TEXTURE_NALU or pcc_stream_id not equal to targetStreamId are removed. Otherwise, if targetAttrType is equal to ATTR_REFLECT, all PCC NAL units with PccNalUnitType not equal to REFLECT_NALU or pcc_stream_id not equal to targetStreamId are removed. Otherwise, if targetAttrType is equal to ATTR_TRANSP, all PCC NAL units with PccNalUnitType not equal to TRANSP_NALU or pcc_stream_id not equal to targetStreamId are removed. Otherwise, if targetAttrType is equal to ATTR_NORMAL, all PCC NAL units with PccNalUnitType not equal to NORMAL_NALU or pcc_stream_id not equal to targetStreamId are removed. For each PCC NAL unit, the first byte may also be removed.

In an alternative embodiment of the first set of methods as summarized in above, the PCC NAL unit header is designed to use more bits for pcc_stream_id and allow for more than four streams for each attribute. In that case, add one more type to the PCC NAL unit header.

Figure 8:
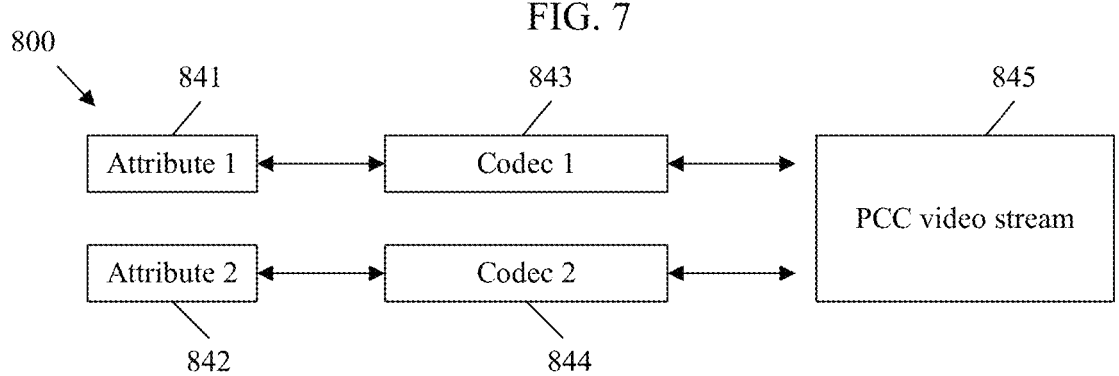
FIG. 8 is a schematic diagram illustrating an example mechanism of encoding PCC attributes with multiple codecs.

FIG. 8 is a schematic diagram illustrating an example mechanism 800 of encoding PCC attributes 841 and 842 with multiple codecs 843 and 844. For example, mechanism 800 can be employed to encode and/or decode attributes of a PCC video stream 700. Accordingly, mechanism 800 can be employed to encode and/or decode a point cloud media frame 600 based on a point cloud media 500. As such, mechanism 800 may be used by an encoder 300 to create a bitstream from a PCC sequence and by a decoder 400 when reconstructing a PCC sequence from a bitstream. Accordingly, mechanism 800 can be employed by a codec system 200 and may be further employed to support method 100.

Mechanism 800 can be applied to a plurality of PCC attributes 841 and 842. For example, PCC attributes 841 and 842 may be any two attributes selected from a group that includes a geometry attribute, a texture attribute, a reflectance attribute, a transparency attribute, and a normal attribute. As shown in FIG. 8, mechanism 800 depicts an encoding process when proceeding from left to right and a decoding process when proceeding from right to left. Codecs 843 and 844 may be any two codecs, such as HEVC, AVC, VVC, etc., or any versions thereof. Certain codecs 843 and 844, or versions thereof, may be more efficient when encoding certain PCC attributes 841 and 842 than others. In this example, codec 843 is used to encode attribute 841, while codec 844 is used to encode attribute 842, respectively. The results of such encodings are combined to create a PCC video stream 845 that contains both PCC attributes 841 and 842. At a decoder, codec 843 is used to decode attribute 841, while codec 844 is used to decode attribute 842, respectively. The decoded attributes 841 and 842 can then be recombined to generate a decoded PCC video stream 845.

The benefit of employing mechanism 800 is that the most efficient codecs 843 and 844 can be selected for the corresponding attributes 841 and 842. Mechanism 800 is not limited to two attributes 841 and 842 and two codecs 843 and 844. For example, each attribute (geometry, texture, reflectance, transparency, and normal) could be encoded by a separate codec. In order to ensure the proper codecs 843 and 844 can be selected to decode the corresponding attributes 841 and 842, the encoder may signal the codecs 843 and 844 and their correspondence to the attributes 841 and 842, respectively. For example, the encoder can include syntax element(s) in a GOF header to indicate the codec to attribute correspondence. The decoder can then read the relevant syntax, select the correct codecs 843 and 844 for the attributes 841 and 842, and decode the PCC video stream 845. As a specific example, an identified_codec_for_attribute syntax element may be employed to indicate the codecs 843 and 844 for the attributes 841 and 842, respectively.

Figure 9:
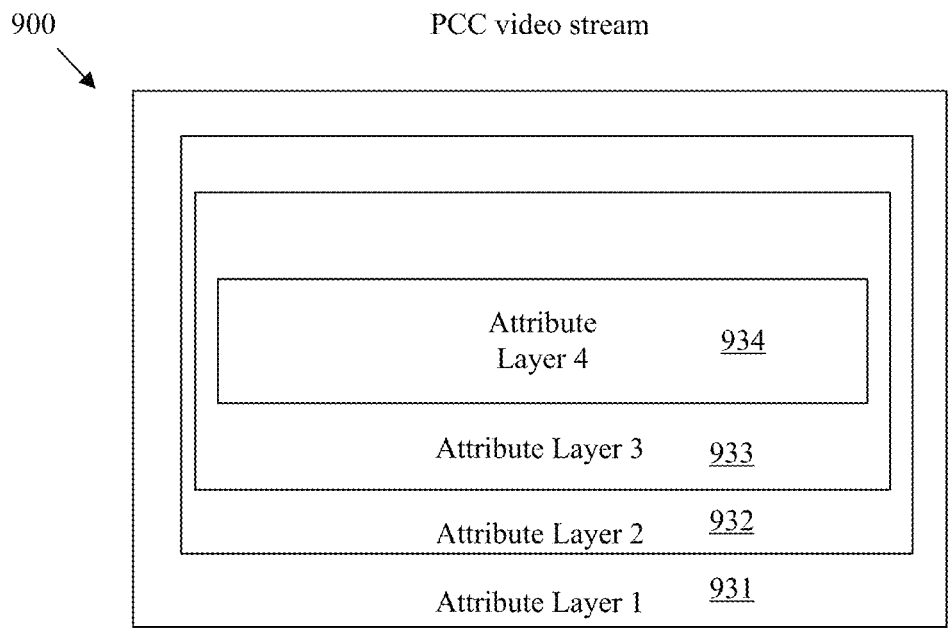
FIG. 9 is a schematic diagram illustrating an example of attribute layers.

FIG. 9 is a schematic diagram 900 illustrating an example of attribute layers 931, 932, 933, and 934. For example, attribute layers 931, 932, 933, and 934 can be employed to carry attributes of a PCC video stream 700. Accordingly, layers 931, 932, 933, and 934 can be employed when encoding and/or decoding a point cloud media frame 600 based on a point cloud media 500. As such, layers 931, 932, 933, and 934 may be used to by an encoder 300 to create a bitstream from a PCC sequence and by a decoder 400 when reconstructing a PCC sequence from a bitstream. Accordingly, layers 931, 932, 933, and 934 can be employed by a codec system 200 and may be further employed to support method 100. In addition, attribute layers 931, 932, 933, and 934 may be used to carry one or more of attributes 841 and 842.

An attribute layer 931, 932, 933, and 934 is a grouping of data related to an attribute that can be stored and/or modified independently of other groupings of data related to the same attribute. As such, each attribute layer 931, 932, 933, and 934 can be altered and or represented without affecting the remaining attribute layers 931, 932, 933, and/or 934. In some examples, attribute layers 931, 932, 933, and/or 934 may be visually represented on top of each other, as shown in FIG. 9. For example, textures covering an entire object (e.g., more general) could be stored in attribute layers 931 with more detailed textures (e.g., more specific) included in attribute layers 932, 933, and/or 934. In another example, attribute layers 931 and/or 932 may be applied to odd numbered frames and attribute layers 933 and/or 934 may be applied to even numbered frames. This may allow some layers to be omitted in response to a change in frame rate. Each attribute may have zero to four attribute layers 931, 932, 933, and/or 934. In order to signal the configuration employed, the encoder may employ a syntax element, such as num_layers_for_attribute[i], in sequence-level data, such as in a GOF header. The decoder can read the syntax element, and determine the number of attribute layers 931, 932, 933, and/or 934 employed for each attribute. Additional syntax elements, such as attribute_layers_combination_mode[i][j] and attrLayerIdx[i][j], can also be employed to indicate the combination of attribute layers employed in the PCC video stream as well as the index for each layer used by a corresponding attribute, respectively.

As yet another example, some attribute layers (e.g. attribute layers 931, 932, and 933) can carry data related to regular patches, while other attribute layers (e.g., attribute layer 934) carry data associated with an irregular point cloud patch. This can be useful as an irregular point cloud may be described using different data than a regular cloud patch. In order to signal that a specific layer carries data associated with an irregular point cloud, the encoder can encode another syntax element in the sequence-level data. As a specific example, a regular_points_flag in the GOF header can be used to indicate that an attribute layer carries at least one irregular point cloud point. The decoder can then read the syntax element and decode the corresponding attribute layer accordingly.

Figure 10:
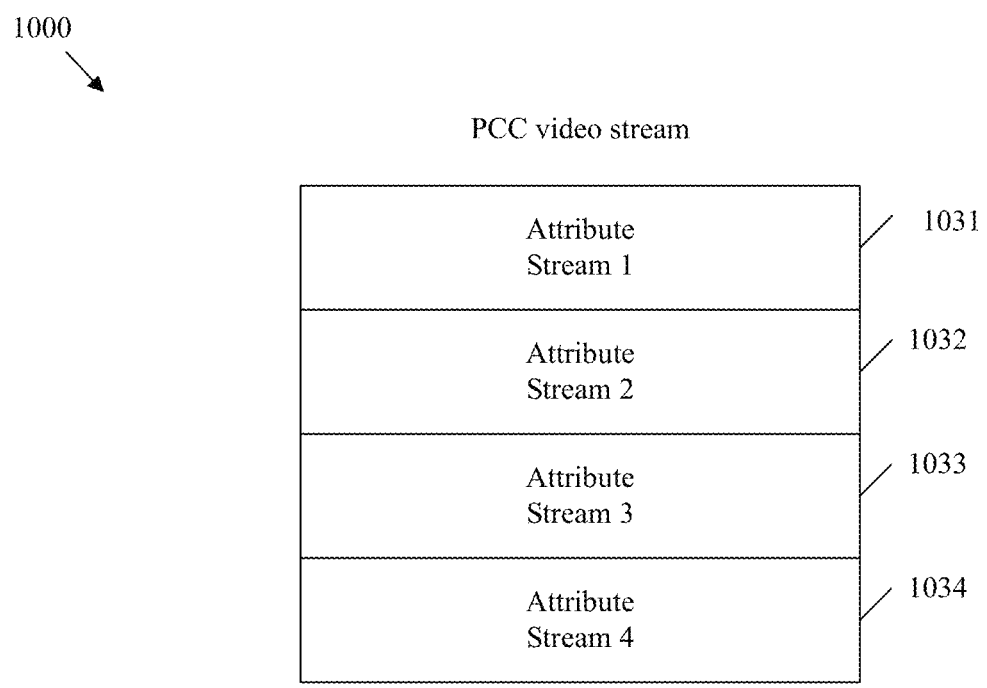
FIG. 10 is a schematic diagram illustrating an example of attribute streams.

FIG. 10 is a schematic diagram 1000 illustrating an example of attribute streams 1031, 1032, 1033, and 1034. For example, attribute streams 1031, 1032, 1033, and 1034 can be employed to carry attributes of a PCC video stream 700. Accordingly, attribute streams 1031, 1032, 1033, and 1034 can be employed when encoding and/or decoding a point cloud media frame 600 based on a point cloud media 500. As such, attribute streams 1031, 1032, 1033, and 1034 may be used to by an encoder 300 to create a bitstream from a PCC sequence and by a decoder 400 when reconstructing a PCC sequence from a bitstream. Accordingly, attribute streams 1031, 1032, 1033, and 1034 can be employed by a codec system 200 and may be further employed to support method 100. In addition, attribute streams 1031, 1032, 1033, and 1034 may be used to carry one or more of attributes 841 and 842. Further, attribute streams 1031, 1032, 1033, and 1034 can be employed to carry attribute layers 931, 932, 933, and 934.

An attribute stream 1031, 1032, 1033, and 1034 is a sequence of attribute data over time. Specifically, attribute streams 1031, 1032, 1033, and 1034 are sub-streams of the PCC video stream. Each attribute stream 1031, 1032, 1033, and 1034 carries a sequence of attribute specific NAL units, and hence acts as a storage and/or transmission data structure. Each attribute stream 1031, 1032, 1033, and 1034 may carry one or more attribute layers 931, 932, 933, and 934 of data. For example, attribute stream 1031 could carry attribute layers 931 and 932, while attribute stream 1032 carries attribute layers 931 and 932 (with attribute streams 1033 and 1034 being omitted.) In another example, each attribute stream 1031, 1032, 1033, and 1034 carries a single corresponding attribute layer 931, 932, 933, and 934. In other examples, some attribute streams 1031, 1032, 1033, and 1034 carry multiple attribute layers 931, 932, 933, and 934, while other attribute streams 1031, 1032, 1033, and 1034 carry a single attribute layer 931, 932, 933, and 934 or are omitted. As can be seen, many combinations and permutations of attribute streams 1031, 1032, 1033, and 1034 and attribute layers 931, 932, 933, and 934 can occur. Accordingly, the encoder can employ a syntax element, such as num_streams_for_attribute, in sequence-level data, such as in the GOF header, to indicate the number of attribute streams 1031, 1032, 1033, and 1034 used to encode each attribute. The decoder can then use such information, for example in combination with the attribute layer information, to decode the attribute streams 1031, 1032, 1033, and 1034 in order to reconstruct the PCC sequence.

Figure 11:
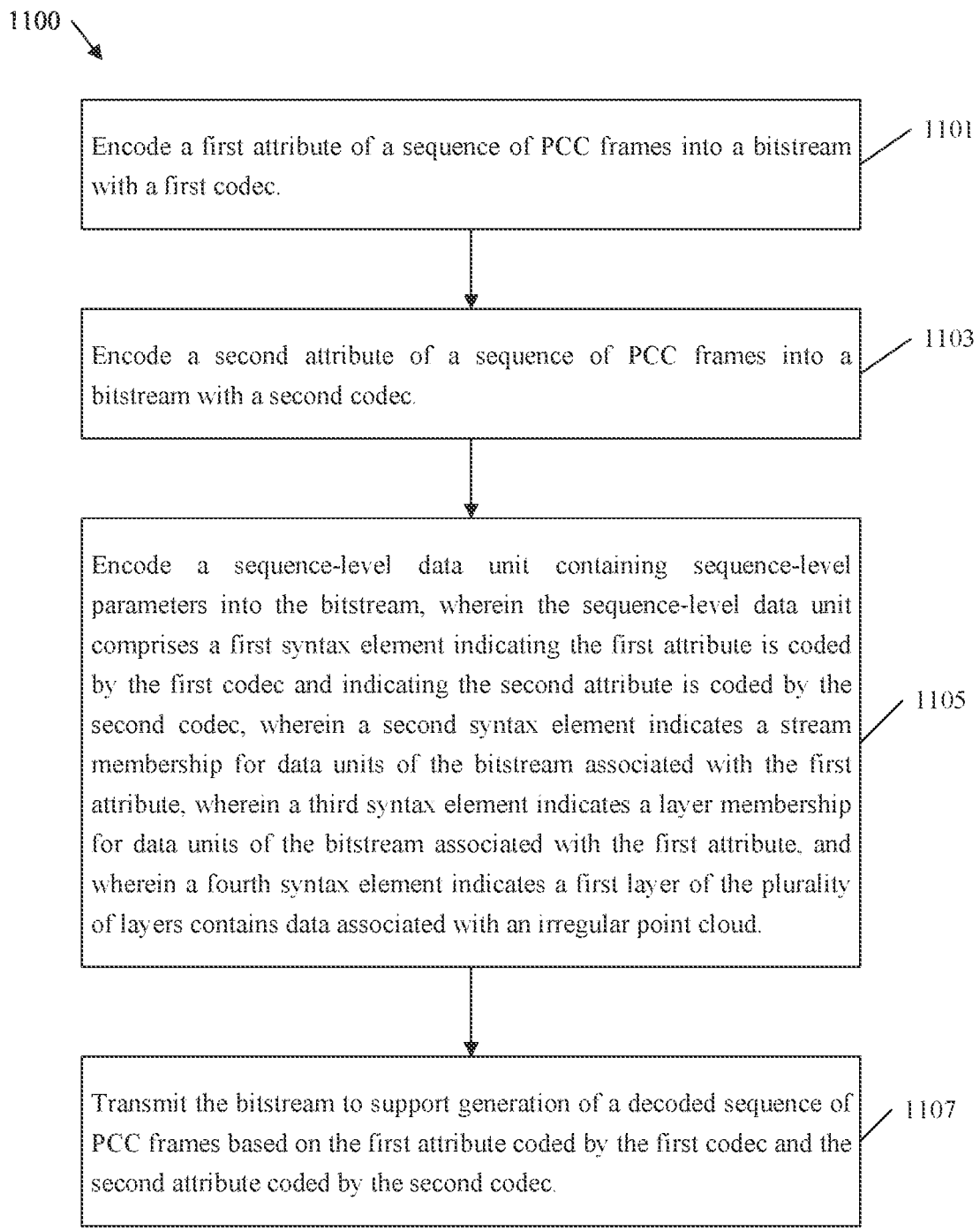
FIG. 11 is a flowchart of an example method of encoding a PCC video sequence with multiple codecs.

FIG. 11 is a flowchart of an example method 1100 of encoding a PCC video sequence with multiple codecs. For example, method 1100 can organize data into a bitstream according to mechanism 800 while using attribute layers 931, 932, 933, and 934 and/or streams 1031, 1032, 1033, and 1034. Also, method 1100 may designate the mechanisms used to encode the attributes in a GOF header. Further, method 1100 may generate a PCC video stream 700 by encoding a point cloud media frame 600 based on a point cloud media 500. In addition, method 1100 may be employed by a codec system 200 and/or an encoder 300 while performing the encoding steps of method 100.

Method 1100 may begin when an encoder receives a sequence of PCC frames containing point cloud media. The encoder may determine to encode such frames, for example in response to receiving a user command. In method 1100, the encoder may determine that a first attribute should be encoded by a first codec, while a second attribute should be encoded by a second codec. This decision may be made based on a predetermined condition and/or based on user input, for example when a first codec is more efficient for a first attribute and a second codec is more efficient for a second attribute. As such, the encoder encodes the first attribute of a sequence of PCC frames into a bitstream with a first codec at step 1101. Further, the encoder encodes the second attribute of the sequence of PCC frames into the bitstream with a second codec that is different from the first codec at step 1103.

At step 1105, the encoder encodes various syntax elements into a bitstream along with the encoded video data. For example, the syntax elements can be coded into a sequence-level data unit containing sequence-level parameters in order to indicate to the decoder the decisions made during encoding so that the PCC frames can be properly reconstructed. Specifically, the encoder can encode the sequence-level data unit to include a first syntax element indicating the first attribute is coded by the first codec and indicating the second attribute is coded by the second codec. As a specific example, the PCC frames may include a plurality of attributes including the first attribute and the second attribute. Also, the plurality of attributes of the PCC frames may include geometry, texture, and one or more of reflectance, transparency, and normal. In addition, the first syntax element may be an identified_codec_for_attribute element contained in a GOF header in the bitstream.

In some examples, the first attribute may be organized into a plurality of streams. In such a case, a second syntax element can be employed to indicate a stream membership for data units of the bitstream associated with the first attribute. In some examples, the first attribute may also be organized into a plurality of layers. In such a case, a third syntax element may indicate a layer membership for data units of the bitstream associated with the first attribute. As a specific example, the second syntax element may be a num_streams_for_attribute element and the third syntax element may be a num_layers_for_attribute element, each of which may be contained in the group of frames header in the bitstream. In yet another example, a fourth syntax element may be used to indicate a first layer of the plurality of layers contains data associated with an irregular point cloud. As a specific example, the fourth syntax element may be a regular_points_flag element contained in the group of frames header in the bitstream.

By including such information in the sequence-level data, a decoder may have sufficient information to decode the PCC video sequence. As such, the encoder may transmit the bitstream at step 1107 in order to support generation of a decoded sequence of PCC frames based on the first attribute coded by the first codec and the second attribute coded by the second codec as well as other attributes and/or syntax elements as described herein.

Figure 12:
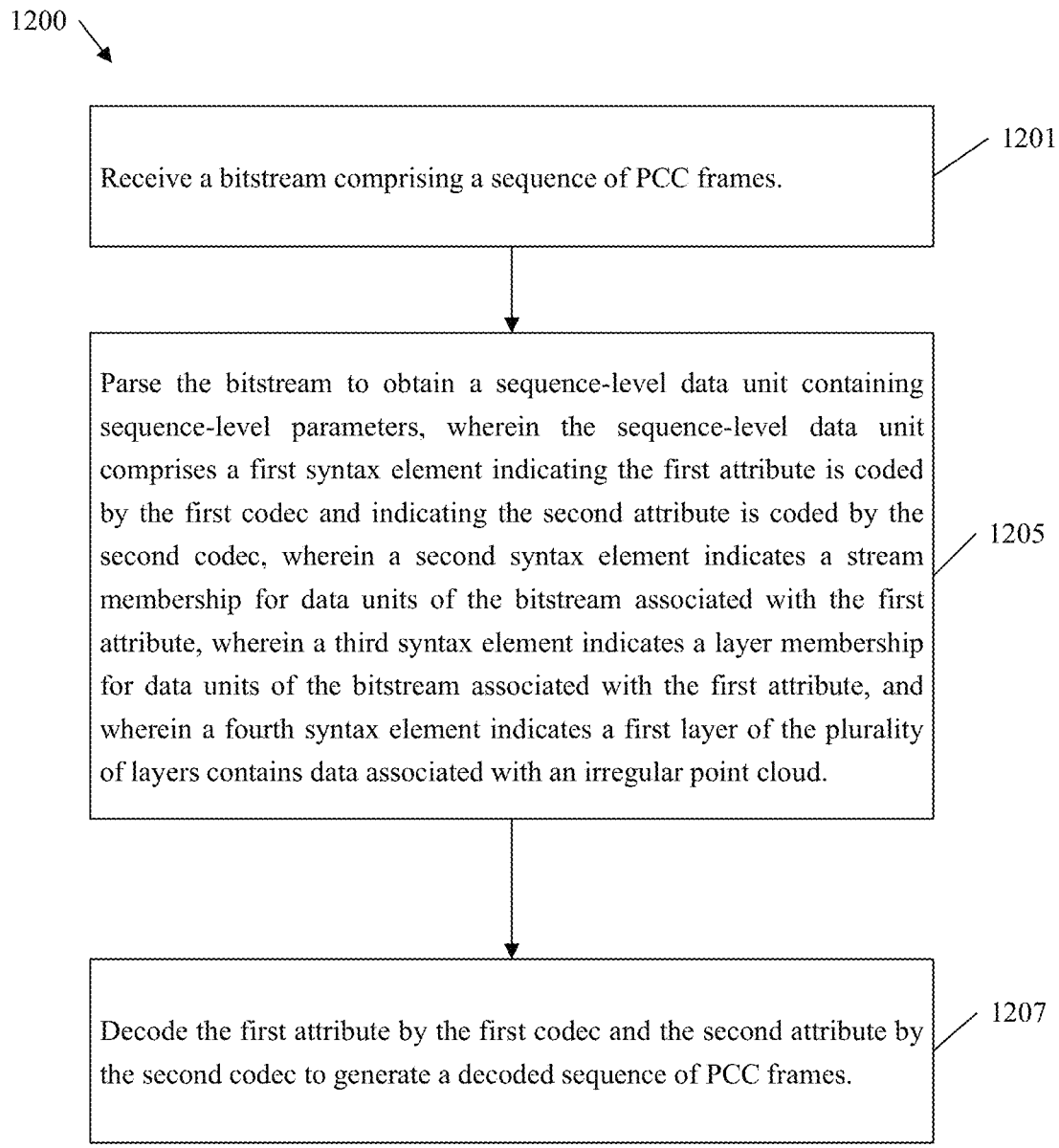
FIG. 12 is a flowchart of an example method of decoding a PCC video sequence with multiple codecs.

FIG. 12 is a flowchart of an example method 1200 of decoding a PCC video sequence with multiple codecs. For example, method 1200 can read data from a bitstream according to mechanism 800 while using attribute layers 931, 932, 933, and 934 and/or streams 1031, 1032, 1033, and 1034. Also, method 1200 may determine the mechanisms used to code the attributes by reading a GOF header. Further, method 1200 may read a PCC video stream 700 in order to reconstruct a point cloud media frame 600 and a point cloud media 500. In addition, method 1200 may be employed by a codec system 200 and/or a decoder 400 while performing the decoding steps of method 100.

Method 1200 may begin when a decoder receives a bitstream including a sequence of PCC frames at step 1201. The decoder can then parse the bitstream or parts thereof at step 1205. For example, the decoder can parse the bitstream to obtain a sequence-level data unit containing sequence-level parameters. The sequence-level data unit may include various syntax elements describing the encoding process. Accordingly, the decoder can parse the video data from the bitstream and use the syntax elements to determine the proper processes to decode the video data.

For example, the sequence-level data unit can include a first syntax element indicating the first attribute is coded by the first codec and indicating the second attribute is coded by the second codec. As a specific example, the PCC frames may include a plurality of attributes including the first attribute and the second attribute. Also, the plurality of attributes of the PCC frames may include geometry, texture, and one or more of reflectance, transparency, and normal. In addition, the first syntax element may be an identified_codec_for_attribute element contained in a GOF header in the bitstream.

In some examples, the first attribute may be organized into a plurality of streams. In such a case, a second syntax element can be employed to indicate a stream membership for data units of the bitstream associated with the first attribute. In some examples, the first attribute may also be organized into a plurality of layers. In such a case, a third syntax element may indicate a layer membership for data units of the bitstream associated with the first attribute. As a specific example, the second syntax element may be a num_streams_for_attribute element and the third syntax element may be a num_layers_for_attribute element, each of which may be contained in the group of frames header in the bitstream. In yet another example, a fourth syntax element may be used to indicate a first layer of the plurality of layers contains data associated with an irregular point cloud. As a specific example, the fourth syntax element may be a regular_points_flag element contained in the group of frames header in the bitstream.

As such, the decoder can decode the first attribute by the first codec and the second attribute by the second codec at step 1207 in order to generate a decoded sequence of PCC frames. The decoder may also make use of the other attributes and/or syntax elements as described herein when determining the proper mechanisms to employ when decoding the various attributes of the PCC video sequence based on the codecs.

Figure 13:
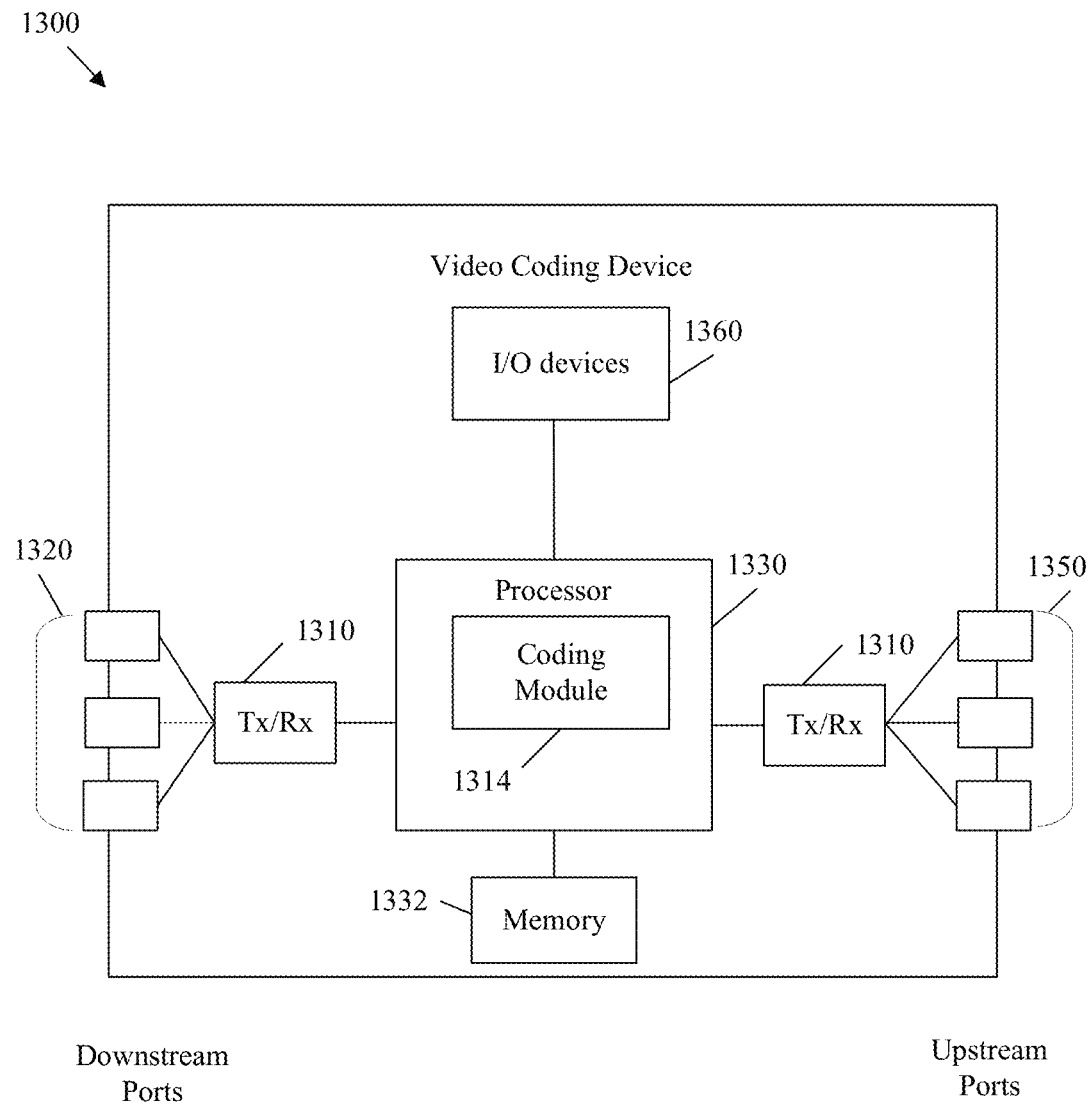
FIG. 13 is a schematic diagram of an example video coding device.

FIG. 13 is a schematic diagram of an example video coding device 1300. The video coding device 1300 is suitable for implementing the disclosed examples/embodiments as described herein. The video coding device 1300 comprises downstream ports 1320, upstream ports 1350, and/or transceiver units (Tx/Rx) 1310, including transmitters and/or receivers for communicating data upstream and/or downstream over a network. The video coding device 1300 also includes a processor 1330 including a logic unit and/or central processing unit (CPU) to process the data and a memory 1332 for storing the data. The video coding device 1300 may also comprise electrical, optical-to-electrical (OE) components, electrical-to-optical (EO) components, and/or wireless communication components coupled to the upstream ports 1350 and/or downstream ports 1320 for communication of data via electrical, optical, or wireless communication networks. The video coding device 1300 may also include input and/or output (I/O) devices 1360 for communicating data to and from a user. The I/O devices 1360 may include output devices such as a display for displaying video data, speakers for outputting audio data, etc. The I/O devices 1360 may also include input devices, such as a keyboard, mouse, trackball, etc., and/or corresponding interfaces for interacting with such output devices.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the downstream ports 1320, Tx/Rx 1310, upstream ports 1350, and memory 1332. The processor 1330 comprises a coding module 1314. The coding module 1314 implements the disclosed embodiments described above, such as methods 100, 1100, 1200, 1500, and 1600 as well as mechanism 800, which may employ a point cloud media 500, a point cloud media frame 600, and/or a PCC video stream 700 coded in layers 931-934 and/or streams 1031-1034. The coding module 1314 may also implement any other method/mechanism described herein. Further, the coding module 1314 may implement a codec system 200, an encoder 300, and/or a decoder 400. For example, the coding module 1314 can employ an expanded attribute set for PCC with multiple streams and layers and can signal usage of such an attribute set in sequence level data to support decoding. Hence, coding module 1314 causes the video coding device 1300 to provide additional functionality and/or flexibility when coding PCC video data. As such, coding module 1314 improves the functionality of the video coding device 1300 as well as addresses problems that are specific to the video coding arts. Further, coding module 1314 effects a transformation of the video coding device 1300 to a different state. Alternatively, the coding module 1314 can be implemented as instructions stored in the memory 1332 and executed by the processor 1330 (e.g., as a computer program product stored on a non-transitory medium).

The memory 1332 comprises one or more memory types such as disks, tape drives, solid-state drives, read only memory (ROM), random access memory (RAM), flash memory, ternary content-addressable memory (TCAM), static random-access memory (SRAM), etc. The memory 1332 may be used as an over-flow data storage device, to store programs when such programs are selected for execution, and to store instructions and data that are read during program execution.

Figure 14:
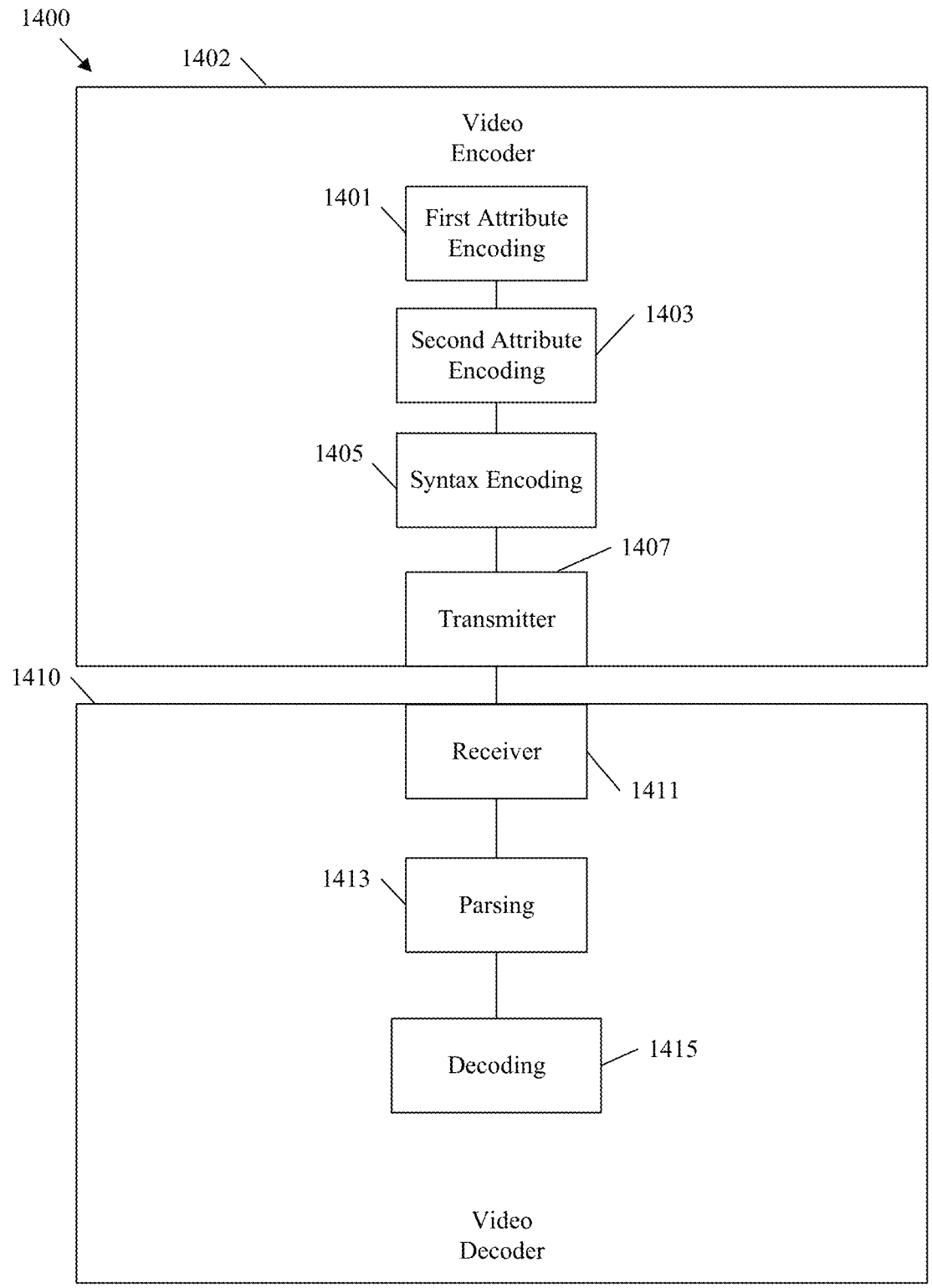
FIG. 14 is a schematic diagram of an example system for coding a PCC video sequence with multiple codecs.

FIG. 14 is a schematic diagram of an example system 1400 for coding a PCC video sequence with multiple codecs. The system 1400 includes a video encoder 1402, which comprises a first attribute encoding module 1401 for encoding a first attribute of a sequence of PCC frames into a bitstream with a first codec. The video encoder 1402 further comprises a second attribute encoding module 1403 for encoding a second attribute of the sequence of PCC frames into the bitstream with a second codec that is different from the first codec. The video encoder 1402 further comprises a syntax encoding module 1405 for encoding a sequence-level data unit containing sequence-level parameters into the bitstream, wherein the sequence-level data unit comprises a first syntax element indicating the first attribute is coded by the first codec and indicating the second attribute is coded by the second codec. The video encoder 1402 further comprises a transmitting module 1407 for transmitting the bitstream to support generation of a decoded sequence of PCC frames based on the first attribute coded by the first codec and the second attribute coded by the second codec. The modules of the video encoder 1402 can also be employed to perform any of the steps/items described above with respect to method 1100 and/or 1500.

The system 1400 also includes a video decoder 1410, which comprises a receiving module 1411 for receiving a bitstream comprising a sequence of PCC frames. The video decoder 1410 further comprises a parsing module 1413 for parsing the bitstream to obtain a sequence-level data unit containing sequence-level parameters, wherein the sequence-level data unit comprises a first syntax element indicating a first attribute of the PCC frames is coded by a first codec and indicating a second attribute of the PCC frames is coded by a second codec. The video decoder 1410 further comprises a decoding module 1415 for decoding the first attribute by the first codec and the second attribute by the second codec to generate a decoded sequence of PCC frames. The modules of the video decoder 1410 can also be employed to perform any of the steps/items described above with respect to method 1200 and/or 1600.

Figure 15:
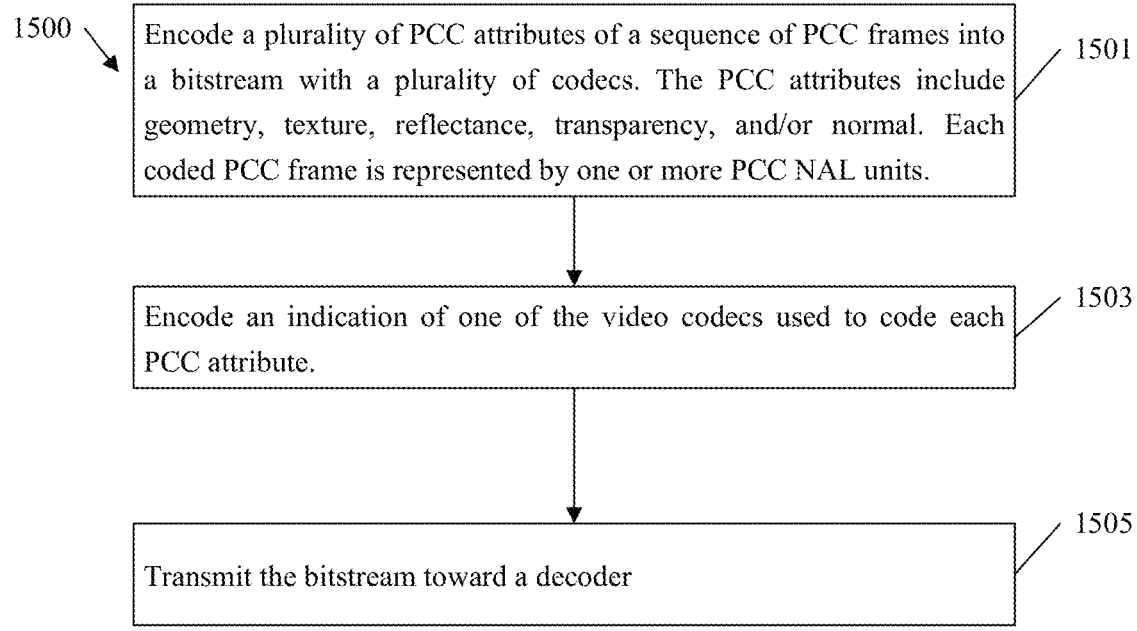
FIG. 15 is a flowchart of another example method of encoding a PCC video sequence with multiple codecs.

FIG. 15 is a flowchart of another example method 1500 of encoding a PCC video sequence with multiple codecs. For example, method 1500 can organize data into a bitstream according to mechanism 800 while using attribute layers 931, 932, 933, and 934 and/or streams 1031, 1032, 1033, and 1034. Also, method 1500 may designate the mechanisms used to encode the attributes in a GOF header. Further, method 1500 may generate a PCC video stream 700 by encoding a point cloud media frame 600 based on a point cloud media 500. In addition, method 1500 may be employed by a codec system 200 and/or an encoder 300 while performing the encoding steps of method 100.

At step 1501, a plurality of PCC attributes are encoded into a bitstream as part of a sequence of PCC frames. The PCC attributes are encoded with a plurality of codecs. The PCC attributes include geometry and texture. The PCC attributes also include one or more of reflectance, transparency, and normal. Each coded PCC frame is represented by one or more PCC NAL units. At step 1503, an indication is encoded for each PCC attribute. The indication indicates the video codec used to code the corresponding PCC attribute. At step 1505, the bitstream is transmitted toward a decoder.

Figure 16:
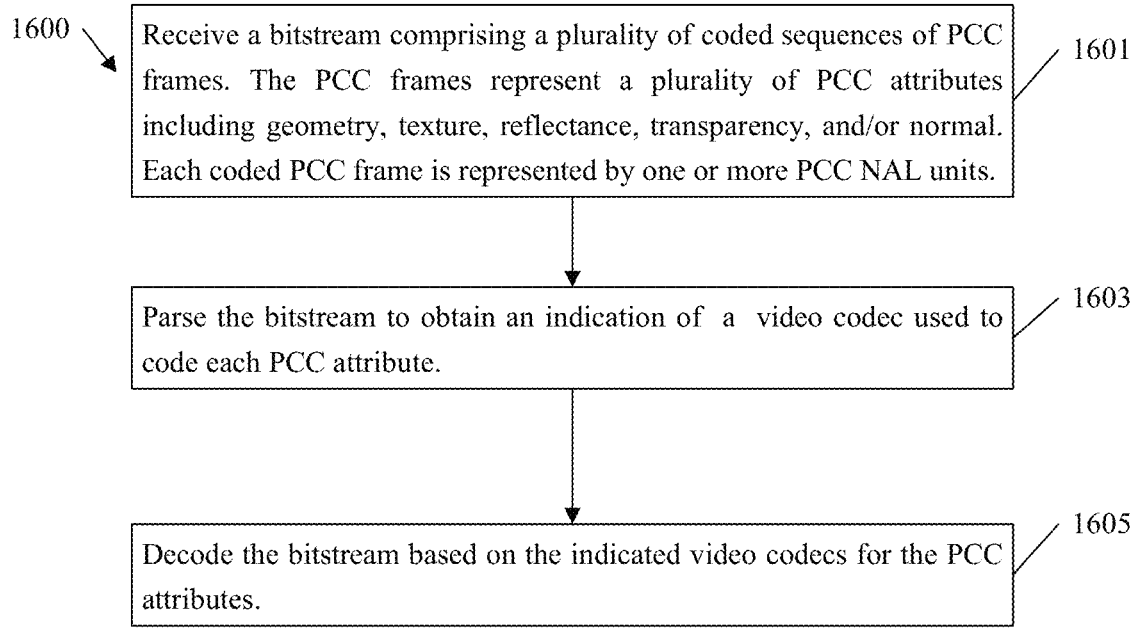
FIG. 16 is a flowchart of another example method of decoding a PCC video sequence with multiple codecs.

FIG. 16 is a flowchart of another example method 1600 of decoding a PCC video sequence with multiple codecs. For example, method 1600 can read data from a bitstream according to mechanism 800 while using attribute layers 931, 932, 933, and 934 and/or streams 1031, 1032, 1033, and 1034. Also, method 1600 may determine the mechanisms used to code the attributes by reading a GOF header. Further, method 1600 may read a PCC video stream 700 in order to reconstruct a point cloud media frame 600 and a point cloud media 500. In addition, method 1600 may be employed by a codec system 200 and/or a decoder 400 while performing the decoding steps of method 100.

At step 1601, a bitstream is received. The bitstream comprises a plurality of coded sequences of PCC frames. The coded sequences of PCC frames represent a plurality of PCC attributes. The PCC attributes include geometry and texture. The PCC attributes also include one or more of reflectance, transparency, and normal. Each coded PCC frame is represented by one or more PCC NAL units. At step 1603, the bitstream is parsed to obtain, for each PCC attribute, an indication of the codec used to code the corresponding PCC attribute. At step 1605, the bitstream is decoded based on the indicated video codecs for the PCC attributes.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a video decoder, the method comprising:

receiving a bitstream comprising a plurality of coded sequences of point cloud coding (PCC) frames, wherein the plurality of coded sequences of PCC frames represent a plurality of PCC attributes including geometry, texture, and one or more of reflectance, transparency, and normal, and wherein each coded PCC frame is represented by one or more PCC network abstraction layer (NAL) units;

parsing the bitstream to obtain, for each PCC attribute, an indication of one of a plurality of video coder decoders (codecs) used to code the each PCC attribute, wherein each sequence of PCC frames is associated with a sequence-level data unit containing sequence-level parameters, wherein the sequence-level data unit comprises a first syntax element indicating a first attribute is coded by a first video codec and indicating a second attribute is coded by a second video codec, wherein the bitstream further comprises an attribute type identifying video data as one or more of attribute texture, attribute reflectance, attribute transparency, and attribute normal; and decoding the bitstream based on the indication of video codecs for the PCC attributes.

2. The method of claim 1, wherein the first syntax element is an identified_codec_for_attribute element contained in a group of frames header in the bitstream.

3. The method of claim 1, wherein the first attribute is organized into a plurality of streams, wherein a second syntax element indicates a stream membership for data units of the bitstream associated with the first attribute, and wherein the second syntax element is a num_streams_for_attribute element contained in a group of frames header in the bitstream.

4. The method of claim 1, wherein the first attribute is organized into a plurality of layers, and wherein a third syntax element indicates a layer membership for data units of the bitstream associated with the first attribute.

5. The method of claim 4, wherein the third syntax element is a num_layers_for_attribute element contained in a group of frames header in the bitstream.

6. The method of claim 4, wherein a fourth syntax element indicates a first layer of the plurality of layers contains data associated with an irregular point cloud.

7. The method of claim 6, wherein the fourth syntax element is a regular_points_flag element contained in a group of frames header in the bitstream.

8. The method of claim 1, wherein the bitstream is decoded into a decoded sequence of PCC frames, and further comprising forwarding the decoded sequence of PCC frames toward a display for presentation.

9. A method implemented in a video encoder, the method comprising:

encoding a plurality of point cloud coded (PCC) attributes of a sequence of PCC frames into a bitstream with a plurality of coder decoders (codecs), wherein the plurality of PCC attributes include geometry, texture, and one or more of reflectance, transparency, and normal, and wherein each coded PCC frame is represented by one or more PCC network abstraction layer (NAL) units, wherein the sequence of PCC frames is associated with a sequence-level data unit containing sequence-level parameters, wherein the sequence-level data unit comprises a first syntax element indicating a first attribute is coded by a first video codec and indicating a second PCC attribute is coded by a second video codec, wherein the bitstream further comprises an attribute type identifying video data as one or more of attribute texture, attribute reflectance, attribute transparency, and attribute normal;

encoding for each PCC attribute, an indication of one of the codecs used to code the each PCC attribute; and transmitting the bitstream toward a decoder.

10. The method of claim 9, wherein the first syntax element is an identified_codec_for_attribute element contained in a group of frames header in the bitstream.

11. The method of claim 9, wherein the first attribute is organized into a plurality of streams, wherein a second syntax element indicates a stream membership for data units of the bitstream associated with the first attribute, and wherein the second syntax element is a num_streams_for_attribute element contained in a group of frames header in the bitstream.

12. The method of claim 9, wherein the first attribute is organized into a plurality of layers, and wherein a third syntax element indicates a layer membership for data units of the bitstream associated with the first attribute.

13. The method of claim 12, wherein the third syntax element is a num_layers_for_attribute element contained in a group of frames header in the bitstream.

14. The method of claim 12, wherein a fourth syntax element indicates a first layer of the plurality of layers contains data associated with an irregular point cloud.

15. The method of claim 14, wherein the fourth syntax element is a regular_points_flag element contained in a group of frames header in the bitstream.

16. A method implemented by a video decoder, the method comprising:

receiving a bitstream comprising a plurality of point cloud coding (PCC) components including geometry, texture, and one or more of reflectance, transparency, and normal represented by one or more network abstraction layer (NAL) units;

parsing the bitstream to obtain a plurality of indications of a plurality of video coder decoders (codecs) used to compress the PCC components, wherein the indications of the video codecs indicate a first PCC component is compressed by a first video codec and a second PCC component is compressed by a second video codec, wherein the bitstream further comprises an attribute type identifying video data as one or more of attribute texture, attribute reflectance, attribute transparency, and attribute normal; and decoding the bitstream based on the indications of the video codecs for the PCC components.

* * * * *